US012790420B2

(12) United States Patent
Roschmann

(10) Patent No.: US 12,790,420 B2

(45) Date of Patent: Nov. 10, 2026

(54) AQUEOUS POLYMER DISPERSION OF VOIDED POLYMER PARTICLES

(71) Applicant: BASF SE, Ludwigshafen am Rhein (DE)

(72) Inventor: Konrad Roschmann, Ludwigshafen am Rhein (DE)

(73) Assignee: BASF SE, Ludwigshafen am Rhein (DE)

(*) Notice: Subject to any disclaimer, the term of this patent is extended or adjusted under 35 U.S.C. 154(b) by 566 days.

(21) Appl. No.: 18/284,347

(22) PCT Filed: Mar. 31, 2022

(86) PCT No.: PCT/EP2022/058553
§ 371 (c)(1),
(2) Date: Sep. 27, 2023

(87) PCT Pub. No.: WO2022/207783
PCT Pub. Date: Oct. 6, 2022

(65) Prior Publication Data

US 2024/0076428 A1 Mar. 7, 2024

(30) Foreign Application Priority Data

Apr. 1, 2021 (EP) .................................... 21166721

(51) Int. Cl.
*C08F 212/08* (2006.01)
*C08F 2/10* (2006.01)
(Continued)

(52) U.S. Cl.
CPC .............. *C08F 212/08* (2013.01); *C08F 2/10* (2013.01); *C08F 220/1811* (2020.02); *C08F 222/14* (2013.01)

(58) Field of Classification Search
None
See application file for complete search history.

(56) References Cited

U.S. PATENT DOCUMENTS 4,654,397 A 3/1987 Mueller-Mall et al.
4,675,249 A * 6/1987 Bowman ................. B01J 13/18 428/914

(Continued)

FOREIGN PATENT DOCUMENTS

CA 1180474 A 1/1985
DE 19624299 A1 1/1997

(Continued)

OTHER PUBLICATIONS

International Search Report and Written Opinion received for PCT Patent Application No. PCT/EP2022/058553, mailed on Aug. 11, 2022, 11 pages.

*Primary Examiner* — Richard A. Huhn
(74) *Attorney, Agent, or Firm* — Faegre Drinker Biddle & Reath LLP

(57) ABSTRACT

The present invention relates to aqueous polymer dispersion of voided polymer particles and to a process for preparing such aqueous polymer dispersions. The present invention also relates to polymer particles, in particular powders of said polymer particles, which are obtained by drying a polymer dispersion. Further aspects of the present invention relate to the use of such voided polymer particles and the polymer dispersions as opacifiers and to paints containing such aqueous polymer dispersions. The voided polymer particles comprise: i) an alkali swellable polymer core of polymerized ethylenically unsaturated monomers M(i) comprising polymerized acid monomers M(i.ac) in an amount sufficient for allowing the polymer core to swell at a pH of at least pH 7.5; ii) an intermediate polymer layer of polymerized ethylenically unsaturated monomers M(ii); and iii) a polymer shell of polymerized ethylenically unsaturated monomers M(iii) having a theoretical glass transition temperature according to Fox of at least 60° C. where the monomers M(iii) comprise at least 10% b.w., based on the total weight of the monomers M(iii), of one or more monomers M(iii.a) whose homopolymers have a glass transition temperature of at least 50° C., where the monomer M(iii.a) is selected from the group consisting of $C_5$-$C_{20}$-cycloalkyl esters of acrylic acid, $C_5$-$C_{20}$-cycloalkyl esters of methacrylic acid, $C_5$-$C_{20}$-cycloalkylmethyl esters of acrylic acid, $C_5$-$C_{20}$-cycloalkylmethyl esters of methacrylic acid, where cycloalkyl in the aforementioned monomers is mono-, bi- or tricyclic and may be unsubstituted or carry 1, 2, 3 or 4 methyl groups; $C_3$-$C_{20}$-heterocycloalkyl esters of acrylic acid, $C_3$-$C_{20}$-heterocycloalkyl esters of methacrylic acid, $C_3$-$C_{20}$-heterocycloalkylmethyl esters of acrylic acid, $C_3$-$C_{20}$-heterocycloalkylmethyl esters of methacrylic acid, where heterocycloalkyl in the aforementioned monomers has a total of 5 to 16 ring-forming atoms, where 1, 2 or 3 non-adjacent ring-forming atoms are oxygen atoms while the remainder of the ring-forming atoms are carbon atoms, and where heterocycloalkyl is mono-, bi- or tricyclic and may be unsubstituted or carry 1, 2, 3 or 4 methyl groups; di-$C_1$-$C_2$-alkyl esters of itaconic acid; and combinations thereof.

27 Claims, No Drawings

(51) Int. Cl.
*C08F 220/18* (2006.01)
*C08F 222/14* (2006.01)

(56) References Cited

U.S. PATENT DOCUMENTS

| | | | |
|---|---|---|---|
| 5,510,422 | A | 4/1996 | Blankenship et al. |
| 5,994,457 | A | 11/1999 | Stanger et al. |
| 6,096,858 | A | 8/2000 | Dobbelaar et al. |
| 8,445,559 | B2 | 5/2013 | Bardman |
| 10,919,999 | B2 | 2/2021 | Bardman et al. |
| 2012/0202686 | A1 | 8/2012 | Doi et al. |
| 2012/0245240 | A1 | 9/2012 | Perez et al. |
| 2015/0378558 | A1 | 12/2015 | Smith et al. |
| 2020/0071439 | A1 | 3/2020 | Bardman et al. |
| 2020/0071558 | A1 | 3/2020 | Bardman et al. |
| 2021/0009816 | A1 | 1/2021 | Liu et al. |

FOREIGN PATENT DOCUMENTS

| | | | |
|---|---|---|---|
| DE | 19621027 | A1 | 11/1997 |
| DE | 19741184 | A1 | 3/1999 |
| DE | 19741187 | A1 | 3/1999 |
| DE | 19805122 | A1 | 4/1999 |
| DE | 19828183 | A1 | 12/1999 |
| DE | 19839199 | A1 | 3/2000 |
| DE | 19840586 | A1 | 3/2000 |
| DE | 19847115 | C1 | 5/2000 |
| EP | 0022633 | A2 | 1/1981 |
| EP | 0184091 | A2 | 6/1986 |
| EP | 0565244 | A1 | 10/1993 |
| EP | 0710680 | A2 | 5/1996 |
| EP | 0771328 | A1 | 5/1997 |
| EP | 2511312 | A1 | 10/2012 |
| EP | 3620476 | A1 | 3/2020 |
| EP | 3620493 | A1 | 3/2020 |
| WO | 2007/050326 | A2 | 5/2007 |
| WO | 2012/130712 | A1 | 10/2012 |
| WO | 2015/024835 | A1 | 2/2015 |
| WO | 2016/004116 | A1 | 1/2016 |
| WO | 2016/028512 | A1 | 2/2016 |
| WO | 2016/116299 | A1 | 7/2016 |
| WO | 2018/065571 | A1 | 4/2018 |
| WO | 2019/164786 | A1 | 8/2019 |

* cited by examiner

AQUEOUS POLYMER DISPERSION OF VOIDED POLYMER PARTICLES

CROSS-REFERENCE TO RELATED APPLICATIONS

This application is a National stage application (under 35 U.S.C. § 371) of PCT/EP2022/058553, filed Mar. 31, 2022, which claims benefit of European Application No. 21166721.7, filed Apr. 1, 2021, both of which are incorporated herein by reference in their entirety.

The present invention relates to aqueous polymer dispersion of voided polymer particles and to a process for preparing such aqueous polymer dispersions. The present invention also relates to polymer particles, in particular powders of said polymer particles, which are obtained by drying a polymer dispersion. Further aspects of the present invention relate to the use of such voided polymer particles and the polymer dispersions as opacifiers and to paints containing such aqueous polymer dispersions.

Paints play an important role in preserving, protecting and beautifying the objects to which they are applied. For example, architectural paints are used to decorate and extend the service life of the interior and exterior surfaces in both residential and commercial buildings. Titanium dioxide ($TiO_2$) is the opacifying pigment of choice for use in paint formulations due to its exceptionally high refractive index. However, the $TiO_2$ is quite expensive and it is therefore desirable to reduce its loading while maintaining high opacifying (hiding) efficiency.

High scattering pigments based on polymeric pigments are known for more than 50 years and allow for at least partial replacement of $TiO_2$. These polymer pigments are voided polymer particles which have a polymer core with micro voids and a non-film-forming polymer sheet which surrounds the voided polymer core. Today, these polymer pigments are provided as aqueous polymer latexes prepared by a multistage emulsion polymerization, comprising (i) at least one stage of preparing a latex of an alkali-swellable polymer, which forms the polymer core, by emulsion polymerization at a pH of below 7, (ii) subsequent neutralization of the thus obtained polymer latex by addition of a base in order to swell the polymer core and (iii) at least one further stage of emulsion polymerizing the monomers forming the non-film-forming polymer shell in the latex of the alkali-swellable polymer.

Upon drying of the polymer latex, a voided polymer core is formed which is stabilized against collapse by the non-film-forming polymer shell.

There are numerous publications in the art which describe polymer latexes of voided polymer particles and methods of their preparation, e.g. EP 22633, EP 565244, WO 2007/050326, EP 2511312, WO 2015/024835, WO 2016/028512, WO 2018/065571, EP 3620476, EP 3620493 and WO 2019/164786, to mention only some of them.

The hiding efficiency of such polymer pigments depends inter alia from a low bulk density, i.e. a high proportion of voids in the core, and the stability against a collapse of the particles. It is apparent that the collapse resistance of the polymer particles will not only depend from the stability of the voided polymer core but it will largely depend on the rigidity of the polymer shell and the efficiency of encapsulation. For this purpose, styrene is the monomer of choice, not least because it forms rigid polymers and thus provides excellent mechanical stability to the shell. Moreover, a styrene has a high refractive index and thus a high amount of polymerized styrene in the voided polymer particles provides for a high refractive index of the particles and thus to a high opacity. However, styrene has a major drawback because it is produced from carbon sources of fossil origin. No processes are currently available for its production by biochemical methods, and its production by conventional methods from carbon sources of biological origin is not economical and has not been realized on a large scale. Since the polymer shell contributes significantly to the total weight of voided polymer particles, their production is associated with a high demand of fossil carbon. Moreover, polymers containing large amounts of polymerized styrene are prone to undergo degradation when subjected to weathering and UV radiation, due to the presence of the benzene ring in styrene.

Therefore, it is an ongoing need for providing monomers which can at least partly replace styrene in the production of voided polymer particles without significantly deteriorating the opacifying property and mechanical stability of the particles. These monomers should be accessible, at least in part, from biological sources and therefore preferably contain carbon of biological origin in an amount of at least 30 mol-%, based on the total amount of carbon in the monomer.

It was surprisingly found that esters of acrylic acid and esters of methacrylic acid alcohols which have saturated carbocyclic or saturated heterocyclic moieties and whose homopolymers have a glass transition temperature of at least 60° C. will meet these objectives.

Therefore, a first aspect of the present invention relates to aqueous polymer dispersions of voided polymer particles, where the polymer particles comprise:

i) an alkali swellable polymer core of polymerized ethylenically unsaturated monomers M(i) comprising polymerized acid monomers M(i.ac) in an amount sufficient for allowing the polymer core to swell at a pH of at least pH 7.5;

ii) an intermediate polymer layer of polymerized ethylenically unsaturated monomers M(ii); and iii) a polymer shell of polymerized ethylenically unsaturated monomers M(iii) having a theoretical glass transition temperature according to Fox of at least 60° C. where the monomers M(iii) comprise at least 10% b.w., based on the total weight of the monomers M(iii), of one or more monomers M(iii.a) whose homopolymers have a glass transition temperature of at least 50° C., where the monomer M(iii.a) is selected from the group consisting of $C_5$-$C_{20}$-cycloalkyl esters of acrylic acid, $C_5$-$C_{20}$-cycloalkyl esters of methacrylic acid, $C_5$-$C_{20}$-cycloalkylmethyl esters of acrylic acid, $C_5$-$C_{20}$-cycloalkylmethyl esters of methacrylic acid, where cycloalkyl in the aforementioned monomers is mono-, bi- or tricyclic and may be unsubstituted or carry 1, 2, 3 or 4 methyl groups;

$C_3$-$C_{20}$-heterocycloalkyl esters of acrylic acid, $C_3$-$C_{20}$-heterocycloalkyl esters of methacrylic acid, $C_3$-$C_{20}$-heterocycloalkylmethyl esters of acrylic acid, $C_3$-$C_{20}$-heterocycloalkylmethyl esters of methacrylic acid, where heterocycloalkyl in the aforementioned monomers has a total of 5 to 16 ring-forming atoms, where 1, 2 or 3 non-adjacent ring-forming atoms are oxygen atoms while the remainder of the ring-forming atoms are carbon atoms, and where heterocycloalkyl is mono-, bi- or tricyclic and may be unsubstituted or carry 1, 2, 3 or 4 methyl groups;

di-$C_1$-$C_2$-alkyl esters of itaconic acid; and combinations thereof.

A second aspect of the invention relates to a process for producing an aqueous polymer dispersion of voided polymer particles as defined herein, which comprises (i) providing an aqueous polymer dispersion of the polymer particles of polymerized ethylenically unsaturated monomers M(i), where the aqueous polymer dispersion has a pH value of less than pH 7;

(ii) subjecting the monomers M(ii) to a radical aqueous emulsion polymerization in the aqueous polymer dispersion provided in step (i) at a pH value of less than pH 7, whereby an aqueous polymer dispersion of polymer particles having an alkali swellable polymer core of polymerized ethylenically unsaturated monomers M(i) and an intermediate layer of polymerized monomers M(ii) is obtained;

(iii) subjecting the monomers M(iii) to a radical aqueous emulsion polymerization in the aqueous polymer dispersion obtained in step (ii)

(iv) a neutralization step, where the polymer dispersion is neutralized to a pH of at least pH 7.5;

where step (iv) is carried out before, during or after step (iii), in particular during or after step (iii) and especially during step (iii).

A further (third) aspect of the present invention relates to polymer compositions of voided polymer particles, in particular to powders of voided polymer particles, which are obtained by drying an aqueous polymer dispersion as disclosed herein.

Another (fourth) aspect of the present invention relates to the use of the aqueous polymer dispersion as described herein or a polymer composition, in particular a polymer powder, obtained by drying an aqueous polymer dispersion as disclosed herein, as an opacifier, in particular in paints, paper coatings, foams, crop protection compositions, cosmetic compositions, liquid inks, or thermoplastic molding compounds. Yet, a further (fifth) aspect of the present invention relates to the use of the aqueous polymer dispersion as disclosed herein or a polymer composition, in particular a polymer powder, obtained by drying an aqueous polymer dispersion as defined herein, for increasing the whiteness in paints. The invention also relates to paints, in particular waterborne paints, which contain a polymer dispersion of voided polymer particles a polymer composition, in particular a polymer powder, obtained by drying an aqueous polymer dispersion as disclosed herein.

Yet, a further (sixth) aspect of the present invention relates to the use of monomers M(iii.a) as described herein in the production of voided polymer particles, in particular in the production of the shell polymer of voided polymer particles. The invention also relates to the use of said monomers M(iii.a) for at least partly replacing styrene in the production of voided polymer particles, in particular in the production of the shell polymer of voided polymer particles.

The present invention is associated with several benefits:

The polymer dispersions are stable and provide good opacifying properties which are comparable or even better than that of polymer dispersions of voided polymer particles, wherein the polymer shell is formed from styrene or similar aromatic monomers.

Since the voided polymer particles contain considerable amounts of monomers M(iii.a), which can be obtained from biological sources, they allow for a significant reduction in the need of fossil carbon, in particular by at least 10%, especially at least 15% or even at least 20%.

Coatings containing a polymer dispersion of the invention as an opacifier or pigment have good weathering resistance, in particular against moisture and UV radiation, in particular good yellowing resistance.

Here and throughout the specification, the term "(meth) acryl" includes both acryl and methacryl groups. Hence, the term "(meth)acrylate" includes acrylate and methacrylate and the term "(meth)acrylamide" includes acrylamide and methacrylamide.

Here and throughout the specification, the term "waterborne paints" means a liquid aqueous paint formulation containing water as the continuous phase in an amount sufficient to achieve flowability.

Here and throughout the specification, the terms "wt.-%" and "% by weight" and "% b.w." are used synonymously. Likewise, the terms polymer dispersion and polymer latex are used synonymously.

Here and throughout the specification, the term "pphm" means parts by weight per 100 parts of monomers and corresponds to the relative amount in % by weight of a certain substance based on the total amount of monomers M.

Here and throughout the specification, the term "ethylenically unsaturated monomer" is understood that the monomer has at least one C═C double bond, e.g. 1, 2, 3 or 4 C═C double bonds, which are radically polymerizable, i.e. which under the conditions of an aqueous radical emulsion polymerization process are polymerized to obtain a polymer having a backbone of carbon atoms. Here and throughout the specification, the term "monoethylenically unsaturated" is understood that the monomer has a single C═C double bond, which is susceptible to radical polymerization under conditions of an aqueous radical emulsion polymerization.

Here and throughout the specification, the terms "ethoxylated" and "polyethoxylated" are used synonymously and refer to compounds having an oligo- or polyoxyethylene group, which is formed by repeating units O—$CH_2CH_2$. In this context, the term "degree of ethoxylation" relates to the number average of repeating units O—$CH_2CH_2$ in these compounds.

Here and throughout the specification, the term "non-ionic" in the context of compounds, especially monomers, means that the respective compound does not bear any ionic functional group or any functional group, which can be converted by protonation or deprotonation into an ionic group.

Here and throughout the specification, the prefixes $C_n$-$C_m$ used in connection with compounds or molecular moieties each indicate a range for the number of possible carbon atoms that a molecular moiety or a compound can have. The term "$C_1$-$C_n$ alkyl" denominates a group of linear or branched saturated hydrocarbon radicals having from 1 to n carbon atoms. The term "$C_n$/$C_m$ alkyl" denominates a mixture of two alkyl groups, one having n carbon atoms while the other having m carbon atoms.

For example, the term $C_1$-$C_{20}$ alkyl denominates a group of linear or branched saturated hydrocarbon radicals having from 1 to 20 carbon atoms, while the term $C_1$-$C_4$ alkyl denominates a group of linear or branched saturated hydrocarbon radicals having from 1 to 4 carbon atoms and the $C_5$-$C_{20}$ alkyl denominates a group of linear or branched saturated hydrocarbon radicals having from 5 to 20 carbon atoms. Examples of alkyl include but are not limited to methyl, ethyl, n-propyl, isopropyl, n-butyl, sec-butyl, isobutyl, tert-butyl, 2-methylpropyl (isopropyl), 1,1-dimethylethyl (tert-butyl), pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methyl-pentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, 2-heptyl, n-octyl, 2-octyl, 2-ethylhexyl, nonyl, isononyl, decyl, undecyl, dodecyl, tridecyl, isotridecyl, tetradecyl, pentadecyl, hexadecyl, heptadecyl, octadecyl, nonadecyl, eicosyl, heneicosyl docosyl and in case of nonyl, isononyl, decyl, undecyl, dodecyl, tridecyl, isotridecyl, tetradecyl, pentadecyl, hexadecyl, heptadecyl, octadecyl, nonadecyl, eicosyl, heneicosyl docosyl their isomers, in particular mixtures of isomers such as "isononyl", "isodecyl". Examples of $C_1$-$C_4$-alkyl are for example methyl, ethyl, propyl, 1-methylethyl, butyl, 1-methylpropyl, 2-methylpropyl or 1,1-dimethylethyl.

The term "$C_5$-$C_{20}$-cycloalkyl" as used herein refers to a saturated mono- or polycyclic, in particular mono-, bi- or tricyclic (cycloaliphatic) radical which is unsubstituted or substituted by 1, 2, 3 or 4 methyl radicals, where the total number of carbon atoms of $C_5$-$C_{20}$-cycloalkyl from 5 to 20 and where the total number of ring-forming atoms is preferably in the range of 5 to 16. Examples of $C_5$-$C_{20}$-cycloalkyl include but are not limited to cyclopentyl, cyclohexyl, methylcyclohexyl, dimethylcyclohexyl, cycloheptyl, cyclooctyl, cyclododecyl, cyclohexadecyl, norbornyl (=bicyclo[2.2.1]heptyl) and isobornyl (=1,7,7-trimethylbicyclo[2.2.1]heptyl).

The term "$C_3$-$C_{20}$-heterocycloalkyl" as used herein refers to a saturated mono- or polycyclic, in particular mono-, bi- or tricyclic (heterocycloaliphatic) radical, which is unsubstituted or substituted by 1, 2, 3 or 4 methyl radicals and which has a total of 5 to 16 ring-forming atoms, where 1, 2 or 3 non-adjacent ring-forming atoms are oxygen atoms while the remainder of the ring-forming atoms are carbon atoms and where the total number of carbon atoms in $C_3$-$C_{20}$-heterocycloalkyl is in the range of 3 to 20. In principle, heterocycloalkyl corresponds to cycloalkyl, where 1, 2 or 3 of non-adjacent $CH_2$ groups are replaced by oxygen ring-forming atoms, resulting in heterocycloaliphatic radicals. Examples of such radicals include, but are not limited to oxolan-2-yl, oxolan-3-yl, oxan-2-yl, oxan-3-yl, oxan-4-yl, 1,3-dioxolan-2-yl, 1,3-dioxolan-4-yl, 2-methyl-1,3-dioxolan-4-yl, 2,2-dimethyl-1,3-dioxolan-4-yl, 1,4-dioxan-2-yl, 1,3-dioxan-2-yl, 1,3-dioxan-4-yl, 1,3-dioxan-5-yl, 2-methyl-1,3-dioxan-4-yl, 2-methyl-1,3-dioxan-5-yl, 2,2-dimethyl-1,3-dioxan-4-yl, 2,2-dimethyl-1,3-dioxan-5-yl, 2,3,3a,5,6,6a-hexahydrofuro[3,2-b]furan-2-yl, 2,3,3a,5,6,6a-hexahydrofuro[3,2-b]furan-3-yl and 2,5-dioxabicyclo[2,2,1]heptan-7-yl.

The term "$C_5$-$C_{20}$-cycloalkylmethyl" as used herein refers to a $C_5$-$C_{20}$-cycloalkyl radical as defined herein, which is bound via a methylene group. Similarly, the term "$C_5$-$C_{20}$-heterocycloalkylmethyl" as used herein refers to a $C_5$-$C_{20}$-heterocycloalkyl radical as defined herein, which is bound via a methylene group.

According to the invention, the monomers M(iii) comprise at least one monomer M(iii.a) as defined herein. The homopolymers of these monomers have a glass transition temperature $T_g$ of at least 50° C., in particular 60° C. especially at least 70° C., e.g. in the range of 50 to 220° C., in particular in the range of 60 to 180° C. and especially in the range of 70 to 140° C. The glass transition temperature as referred to herein is the actual glass transition temperature determined experimentally by the differential scanning calorimetry (DSC) method according to ISO 11357-2:2013, preferably with sample preparation according to ISO 16805:2003.

Preference is given to the monomers M(iii.a), which are selected from the group consisting of

- $C_6$-$C_{12}$-cycloalkyl esters of acrylic acid, $C_6$-$C_{12}$-cycloalkyl esters of methacrylic acid, where cycloalkyl in the aforementioned monomers is mono- or bicyclic and may be unsubstituted or carry 1, 2 or 3 methyl groups;
- $C_3$-$C_{12}$-heterocycloalkyl esters of acrylic acid, $C_3$-$C_{12}$-heterocycloalkyl esters of methacrylic acid, $C_3$-$C_{12}$-heterocycloalkylmethyl esters of acrylic acid, $C_3$-$C_{12}$-heterocycloalkylmethyl esters of methacrylic acid, where heterocycloalkyl in the aforementioned monomers has a total of 5 to 12 ring-forming atoms, where 1 or or 2 non-adjacent ring-forming atoms are oxygen atoms while the remainder of the ring-forming atoms are carbon atoms, and where heterocycloalkyl is mono- or bicyclic and may be unsubstituted or carry 1, 2, 3 or 4 methyl groups;
- di-$C_1$-$C_2$-alkyl esters of itaconic acid; and combinations thereof.

Examples of preferred monomers M(iii.a) are cyclohexyl methacrylate, 2-norbornyl acrylate, norbornyl methacrylate, isobornyl acrylate, isobornyl methacrylate, cyclohexylmethyl acrylate, cyclohexylmethyl methacrylate, 1,3-dioxan-5-yl-acrylate, 1,3-dioxan-5-yl-methacrylate, 2,2-dimethyl-1,3-dioxan-5-yl-acrylate, 2,2-dimethyl-1,3-dioxan-5-yl-methacrylate, 1,3-dioxolan-4-yl-methyl acrylate, 1,3-dioxolan-4-ylmethyl methacrylate, 2,2-dimethyl-1,3-dioxolan-4-ylmethyl acrylate, 2,2-dimethyl-1,3-dioxolan-4-ylmethyl methacrylate, oxolan-2-yl-methyl acrylate (tetrahydrofurfuryl acrylate), oxolan-2-yl-methyl methacrylate (tetrahydrofurfuryl methacrylate), 2,5-dioxabicyclo[2,2,1]heptan-7-yl acrylate, 2,5-dioxabicyclo[2,2,1]heptan-7-yl methacrylate and dimethyl itaconate and combinations thereof.

Particular preference is given to the monomers M(iii.a), which are selected from the group consisting of

- $C_6$-$C_{10}$-cycloalkyl esters of acrylic acid, $C_6$-$C_{10}$-cycloalkyl esters of methacrylic acid, where cycloalkyl in the aforementioned monomers bicyclic and may be unsubstituted or carry 1, 2 or 3 methyl groups;
- $C_3$-$C_{10}$-heterocycloalkyl esters of methacrylic acid, $C_3$-$C_{10}$-heterocycloalkylmethyl esters of methacrylic acid, where heterocycloalkyl in the aforementioned monomers has a total of 5 to 10 ring-forming atoms, where 1 or 2 non-adjacent ring-forming atoms are oxygen atoms while the remainder of the ring-forming atoms are carbon atoms, and where heterocycloalkyl is mono- or bicyclic and are unsubstituted or carry 1 or 2 methyl groups and which are in particular unsubstituted;
- di-$C_1$-$C_2$-alkyl esters of itaconic acid; and combinations thereof.

Examples of particularly preferred monomers M(iii.a) are dimethyl itaconate, 2-norbornyl acrylate, 2-norbornyl methacrylate, 2-isobornyl acrylate, 2-isobornyl methacrylate, 1,3-dioxan-5-yl-methacrylate, 1,3-dioxolan-4-ylmethyl methacrylate and combinations thereof.

The monomers M(iii.a) are produced by esterification of acrylic acid or methacrylic acid with the respective (hetero)cycloalkanol or (hetero)cycloalkylmethanol. Said (hetero)cycloalkanols and (hetero)cycloalkylmethanols can be produced on large scale from biological sources or renewable raw materials, respectively, e.g. by fermentation of glucose, starch or cellulose containing raw materials. Therefore, including monomers M(iii.a) into the voided polymer particles significantly increases the amount of bio-carbon in the polymer particles and thereby reduces the demand of fossil carbon and, hence, the $CO_2$ demand of the production of the polymer dispersion of the invention.

Therefore, a particular embodiment of the invention relates to a polymer dispersions as defined herein, wherein the at least the carbon atoms of the (hetero)cycloalkyl group and the (hetero)cycloalkylmethyl group, respectively, in the monomers M(iii.a) are of biological origin, i.e. e. they are at least partly made of bio-carbon. In particular, the respective (hetero)cycloalkanols and (hetero)cycloalkylmethanols used for the production of the monomers M(iii.a) preferably have a content of bio-carbon of at least 70 mol-%, based on the total amount of carbon atoms in the respective (hetero) cycloalkanols and (hetero)cycloalkylmethanols. This content is advantageously higher, in particular greater than or equal to 80 mol-%, preferably greater than or equal to 90 mol-% and advantageously equal to 100 mol-%. Likewise, itaconic acid and $C_1$-$C_2$-alkalanols can be produced on large scale from renewable materials, e.g. by fermentation of glucose, starch or cellulose containing raw materials. Similarly, acrylic acid and methacrylic acid may be produced from renewable materials. However, acrylic acid and methacrylic acid produced from biomaterials are not available on large scale so far. Consequently, the monomers M(iii.a) have a content of bio-carbon of preferably at least 30 mol-%, in particular at least 35 mol-% and especially at least 40 mol-%, based on the total amount of carbon atoms in the monomers M(iii.a), respectively. By using monomers M1, which are at least partly of biological origin, the demand of fossil carbon in the polymer latex can be significantly reduced. In particular, the amount of carbon of biological origin of at least 10 mol-%, in particular at least 15 mol-% or at least 20 mol-% or higher can be achieved.

The term "bio-carbon" indicates that the carbon is of biological origin and comes from a biomaterial/renewable resources. The content in bio-carbon and the content in biomaterial are expressions that indicate the same value. A material of renewable origin or biomaterial is an organic material wherein the carbon comes from the $CO_2$ fixed recently (on a human scale) by photosynthesis from the atmosphere. A biomaterial (Carbon of 100% natural origin) has an isotopic ratio $^{14}C/^{12}C$ greater than $10^{-12}$, typically about $1.2\times10^{-12}$, while a fossil material has a zero ratio. Indeed, the isotopic $^{14}C$ is formed in the atmosphere and is then integrated via photosynthesis, according to a time scale of a few tens of years at most. The half-life of the $^{14}C$ is 5,730 years. Thus, the materials coming from photosynthesis, namely plants in general, necessarily have a maximum content in isotope $^{14}C$. The determination of the content of biomaterial or of bio-carbon is can be carried out in accordance with the standards ASTM D 6866-12, in particular the method B (ASTM D 6866-18) and ASTM D 7026 (ASTM D 7026-04).

The monomers M(iii) comprise the monomers M(iii.a) in amount of at least 10% b.w., in particular at least 15% b.w., more particularly at least 20% b.w. especially at least 25% b.w., based on the total weight of the monomers M(iii) which form the polymer shell. The amount of monomers M(iii.a) may be up to 100% b.w., based on the total weight of the monomers M(iii) which form the polymer shell. Frequently, the amount of monomers M(iii.a) is in the range of 10 to 90% b.w., in particular 15 to 80% b.w., more particularly in the range of 20 to 70% b.w., especially in the range of 25 to 65% b.w., based on the total weight of the monomers M(iii) which form the polymer shell.

In preferred groups of embodiments, the monomers M(iii), which form the polymer shell, comprise at least further monomer M(iii.b), which is selected from monovinyl aromatic hydrocarbon monomers, in addition to the monomers M(iii.a). Suitable monovinyl aromatic hydrocarbon monomers are aromatic hydrocarbons, which are substituted by 1 vinyl group and which may further carry 1, 2 or 3 $C_1$-$C_4$-alkyl groups on the aromatic ring and which preferably have from 8 to 12 carbon atoms. Preference is given to monovinylbenzenes, which may further carry 1, 2 or 3 $C_1$-$C_4$-alkyl groups on the benzene ring and which have from 8 to 12 carbon atoms. Examples of monovinyl aromatic hydrocarbon monomers are styrene, 2-, 3- or 4-vinyltoluene and 4-tert.-butyltoluene. In particular, the monomer M(iii.b) is styrene or comprises at least 90% b.w. of styrene, based on the total amount of monomers M(iii.b). If present, the amount of monomer M(iii.b) is typically in the range of 10 to 90% b.w., in particular in the range of 20 to 85% b.w., more particularly in the range of 30 to 80% b.w., especially in the range of 35 to 75% b.w., based on the total weight of the monomers M(iii).

The monomers M(iii), which form the polymer shell, may further comprise one or more further monomers M(iii.c), which are selected alkenyl nitrile monomers, in particular from $C_2$-$C_6$-alkylenyl nitriles in addition to the monomers M(iii.a) and optionally M(iii.b). In a particular preferred group of embodiments, the monomers M(iii) comprise at least one monomer M(iii.b) and at least one monomer M(iii.c) in addition to the monomer(s) M(iii.a). The monomer M(iii.c) is in particular acrylonitrile. The amount of monomers M(iii.c) will usually not exceed 25% b.w., in particular 20% b.w., more particular 15% b.w. and especially 10% b.w., based on the total weight of the monomers M(iii). If present, the amount of monomer M(iii.c) is typically in the range of 1 to 25% b.w., in particular in the range of 2 to 20% b.w., more particularly in the range of 3 to 15% b.w., especially in the range of 4 to 10% b.w., based on the total weight of the monomers M(iii).

The total amount of monomers M(iii.a), M(iii.b) and M(iii.c) is generally at least 95% b.w., in particular 98% b.w., based on the total amount of monomers M(iii).

In particular, the monomers M(iii) comprise a) 10 to 90% b.w. or 10 to 88.9% b.w., in particular 15 to 80% b.w. or 15 to 77.8% b.w., more particularly 20 to 70% b.w. or 20 to 66.7% b.w., especially 25 to 65% b.w. or 25 to 60% b.w., based on the total weight of the monomers M(iii), of at least one monomer M(iii.a); and b) 10 to 90% b.w. or 10 to 88.9% b.w., in particular 20 to 85% b.w. or 20 to 82.8% b.w., more particularly 30 to 80% b.w. or 30 to 76.7% b.w., especially 35 to 75% b.w. or 35 to 70% b.w., based on the total weight of the monomers M(iii), of at least one monomer M(iii.b);

c) 0 to 25% or 1 to 25% b.w., in particular 0 to 20% b.w. or 2 to 20% b.w., more particular 0 to 15% b.w. or 3 to 15% b.w., especially 0 to 10% b.w. or 4 to 10% b.w., based on the total weight of the monomers M(iii), of one or more monomers M(iii.c);

where the total amount of monomers M(iii.a), M(iii.b) and M(iii.c) is at least 95% b.w., in particular 98% b.w., based on the total amount of monomers M(iii).

The monomers M(iii) may comprise minor amounts of other monomers, which are different from the monomers M(iii.a), M(iii.b) and M(iii.c), respectively. Such monomers include e.g. crosslinking monomers M(iii.cr), ethylenically unsaturated acidic monomers M(iii.ac) and monoethylenically unsaturated non-ionic monomers M(iii.ni) which have a solubility in deionized water at 20° C. and 1 bar of at least 80 g/l.

Typical crosslinking monomers M(iii.cr) have at least 2 non-conjugated, ethylenically unsaturated double bonds, in particular, 2, 3 or 4 non-conjugated, ethylenically unsaturated double bonds. The amount of monomers M(iii.cr) will typically not exceed 2% b.w. in particular 1% b.w. and especially 0.5% b.w., based on the total weight of monomers M(iii). If present, the amount of monomers M(iii.cr) is typically in the range of 0.01 to 2% b.w., in particular in the range of 0.02 to 1% b.w., especially in the range of 0.05 to 0.5% b.w., based on the total weight of monomers M(iii).

Examples of monomers M(iii.Cr) include:

- diesters of monoethylenically unsaturated $C_3$-$C_6$ monocarboxylic acids with saturated aliphatic or cycloaliphatic diols, in particular diesters of acrylic acid or methacrylic acid, such as the diacrylates and the dimethacrylates of ethylene glycol (1,2-ethanediol), propylene glycol (1,2-propanediol), 1,2-butanediol, 1,3-butanediol, 1,4-butanediol, neopentyl glycol (2,2-dimethyl-1,3-propanediol), 1,6-hexanediol and 1,2-cyclohexanediol;
- monoesters of monoethylenically unsaturated $C_3$-$C_6$ monocarboxylic acids with monoethylenically unsaturated aliphatic or cycloaliphatic monohydroxy compounds, such as the acrylates and the methacrylates of vinyl alcohol (ethenol), allyl alcohol (2-propen-1-ol), 2-cyclohexen-1-ol or norbornenol, such as vinyl acrylate, vinyl methacrylate, allyl acrylate and allyl methacrylate;
- vinyl and allyl ethers of polyols, such as butanediol divinyl ether, trimethylolpropane trivinyl ether, pentaerythritol triallyl ether, triallylsucrose, pentaallylsaccharose and pentaallylsucrose,
- vinyl and allyl urea compounds, such as divinylethylene urea, divinylpropylene urea, and triallyl cyanurate;
- polyunsaturated silicon compounds such as tetraallylsilane, tetravinylsilane and bis- or tris(meth)acryloylsiloxanes; and
- divinyl aromatic compounds, such as 1,3-divinyl benzene, 1,4-divinyl benzene.

Typical acidic monomers M(iii.ac) have at least 1 acidic group, such as a carboxyl group, a phosphonate group a phosphate group or a sulfonate group. The acidic monomers may be present in their acidic form or in their salt form. The amount of acidic monomers M(iii.ac) will typically not exceed 5% b.w. in particular 2% b.w. and especially 1% b.w., based on the total weight of monomers M(iii). If present, the amount of monomers M(iii.ac) is typically in the range of 0.05 to 5% b.w., in particular in the range of 0.1 to 2% b.w., especially in the range of 0.1 to 1.0% b.w., based on the total weight of monomers M(iii).

Monomers M(iii.ac) are preferably selected from the group consisting of monoethylenically unsaturated $C_3$-$C_8$ monocarboxylic acids, monoethylenically unsaturated $C_4$-$C_8$ dicarboxylic acids, the monomethyl esters of monoethylenically unsaturated $C_4$-$C_8$ dicarboxylic acids and ethylenically unsaturated fatty acids.

Examples of monoethylenically unsaturated $C_3$-$C_8$ monocarboxylic acids include but are not limited to acrylic acid, methacrylic acid, acryloyloxypropionic acid, methacryloyloxypropionic acid, acryloyloxyacetic acid, methacryloyloxyacetic acid and crotonic acid. Examples of monoethylenically unsaturated $C_4$-$C_8$ dicarboxylic acids include but are not limited to maleic acid, fumaric acid and itaconic acid.

Ethylenically unsaturated fatty acids typically have 10 to 24 carbon atoms and 1 to 4 double bonds in the molecule. Examples of ethylenically unsaturated fatty acids include but are not limited to oleic acid, ricinoleic acid, palmitoleic acid, elaidic acid, vaccenic acid, icosenoic acid, cetoleic acid, erucic acid, nervonic acid, arachidonic acid, timnodonic acid, clupanodonic acid and mixtures of ethylenically unsaturated fatty acids obtained from saponification of plant oils such as linseed oil fatty acid.

Amongst the monomers M(iii.ac) preference is given to monoethylenically unsaturated $C_3$-$C_8$ monocarboxylic acids, in particular to acrylic acid and methacrylic acid, especially to methacrylic acid and to mixtures of monoethylenically unsaturated $C_3$-$C_8$ one or more monoethylenically unsaturated $C_3$-$C_8$ monocarboxylic acids with one or more unsaturated fatty acids such as mixtures of methacrylic acid with linseed-oil fatty acid.

Suitable non-ionic monoethylenically unsaturated monomers M(iii.ni) are e.g. those which have a functional group selected from hydroxyalkyl groups, in particular hydroxy-$C_2$-$C_4$-alkyl groups and the primary carboxamide group. Examples for monomers M(iii.ni) having a carboxamide include, but are not limited to primary amides of monoethylenically unsaturated monocarboxylic acids having 3 to 6 carbon atoms, such as acrylamide and methacrylamide. The amount of monomers M(iii.ni) will typically not exceed 5% b.w. in particular 2% b.w. and especially 1% b.w., based on the total weight of monomers M(iii). If present, the amount of monomers M(iii.ni) is typically in the range of 0.05 to 5% b.w., in particular in the range of 0.1 to 2% b.w., especially in the range of 0.1 to 1.0% b.w., based on the total weight of monomers M(iii).

Examples for monomers M(iii.ni) having a hydroxyalkyl group include, but are not limited to hydroxy-$C_2$-$C_4$ alkyl esters of acrylic acid and of methacrylic acid such as 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, and mixtures thereof.

The monomers forming the polymer shell may also comprise one or more plasticizer monomers M(iii.p). Plasticizer monomers are those which are not capable of undergoing a radical homopolymerization and/or which have a ceiling temperature of less than 181° C., in particular less than 110° C. Typical plasticizer monomers include 2-propenylaromatic hydrocarbons, di- and trisubstituted olefins having 4 to 8 carbon atoms, such as 2-methyl-2-butene and 2,3-dimethyl-2-butene, 1,1-diphenylethene, $C_1$-$C_{10}$-alkyl esters of 2-(branched $C_3$-$C_6$ alkyl)acrylic acid, such as $C_1$-$C_{10}$-alkyl esters of 2-(tert-butyl)acrylic acid, $C_1$-$C_{10}$-alkyl esters of 2-phenylacrylic acid (atropic acid), and mixtures thereof. In particular, the plasticizer monomer is selected from 2-propenylaromatic hydrocarbons, such as alpha-methylstyrene. The amount of plasticizer monomers M(iii.p) is typically in the range of 0.5 to 20% b.w., in particular 1 to 10% b.w. based on the total weight of monomers M(iii).

Preferably, the polymer shell has an actual glass transition temperature of at least 50° C., in particular at least 60° C. and especially at least 70° C., e.g. in the range of 50 to 200° C., in particular in the range of 60 to 180° C. and especially in the range of 70 to 150° C. As mentioned above, the glass transition temperature Tg can be determined experimentally by the differential scanning calorimetry (DSC) method according to ISO 11357-2:2013, preferably with sample preparation according to ISO 16805:2003.

The actual glass transition temperature depends from the monomer compositions forming the copolymer contained in the polymer particles of the aqueous polymer latex according to the present invention, while a theoretical glass transition temperature $Tg^t$ can be calculated from the monomer composition used in the emulsion polymerization. The theoretical glass transition temperatures are usually calculated from the monomer composition by the Fox equation:

$$1/Tg^t=x_a/Tg_a+x_b/Tg_b+\ldots x_n/Tg_n,$$

In this equation, $x_a$, $x_b$, . . . $x_n$ are the mass fractions of the monomers a, b, . . . n, and $Tg_a$, $Tg_b$, . . . $Tg_n$ are the actual glass transition temperatures in Kelvin of the homopolymers synthesized from only one of the monomers a, b, . . . n at a time. The Fox equation is described by T. G. Fox in Bull. Am. Phys. Soc. 1956, 1, page 123 and as well as in Ullmann's Encyclopädie der technischen Chemie [Ullmann's Encyclopedia of Industrial Chemistry], vol. 19, p. 18, 4th ed., Verlag Chemie, Weinheim, 1980. The actual Tg values for the homopolymers of most monomers are known and listed, for example, in Ullmann's Encyclopädie der technischen Chemie [Ullmann's Encyclopedia of Industrial Chemistry], 5th ed., vol. A21, p. 169, Verlag Chemie, Weinheim, 1992. Further sources of glass transition temperatures of homopolymers are, for example, J. Brandrup, E. H. Immergut, Polymer Handbook, 1st Ed., J. Wiley, New York 1966, 2nd Ed. J. Wiley, New York 1975, 3rd Ed. J. Wiley, New York 1989 and 4th Ed. J. Wiley, New York 2004.

Usually, the theoretical glass temperature $Tg^t$ calculated according to Fox as described herein and the experimentally determined glass transition temperature as described herein are similar or even same and do not deviate from each other by more than 5 K, in particular they deviate not more than 2 K. Accordingly, both the actual and the theoretical glass transition temperatures of the copolymer can be adjusted by choosing proper monomers a, b . . . n and their mass fractions $x_a$, $x_b$, . . . $x_n$ in the monomer composition so to arrive at the desired glass transition temperature Tg. It is common knowledge for a skilled person to choose the proper amounts of monomers a, b . . . n for obtaining a copolymer with the desired glass transition temperature.

The polymer shell, which is arranged on the intermediate layer of the polymer particles, may be a single polymer shell or may comprise two or more shells. Preferably, the polymer particles have a first polymer shell of polymerized monomers M(iii.1) arranged on the intermediate layer of the polymer particles and at least one further polymer shell of polymerized monomers M(iii.2) arranged on the first polymer shell. The monomers M(iii.1) and M(iii.2) are selected from the monomers M(iii) and at least one of the monomers M(iii.1) and M(iii.2) comprise at least one monomer M(iii.a). The weight ratio of the first polymer shell to the second polymer shell is typically at least 1:1 and may be as high as 50:1 or higher. Preferably, the weight ratio of the first polymer shell to the second polymer shell is in the range of 2:1 to 20:1, in particular in the range of 4:1 to 18:1 and especially in the range of 6:1 to 12:1. Consequently, the weight ratio of the monomers M(iii.1) to the monomers M(iii.2) is at least 1:1 and up to 50:1 or higher and it is preferably in the range of 2:1 to 20:1, in particular in the range of 4:1 to 18:1 and especially in the range of 6:1 to 12:1.

In the polymer dispersion the polymer shell constitutes the major amount of the polymer particles. The relative weight of the shell polymer with respect to the total weight of the polymer particles is preferably at least 60% b.w., in particular at least 70% b.w. and in particular in the range of 60 to 95% b.w., preferably in the range of 70 to 95% b.w. and especially in the range of 77 to 92% b.w., based on the total weight of the polymer particles. Consequently, the relative amount of monomers M(iii) is in particular in the range of 60 to 95% b.w., preferably in the range of 70 to 93% b.w. and especially in the range of 77 to 91% b.w., based on the total weight of the monomers forming polymer particles.

The monomers M(iii.1) which form the first shell and the monomers M(iii.2) which form the second and further polymer shells may have the same overall monomer composition. Preferably the monomers M(iii.1) and the monomers M(iii.2) are distinct in that they contain the same monomers in different amounts or they contain different types of monomers. For example, the monomers M(iii.1) and the monomers M(iii.2) may both comprise a monomer M(iii.b) and only one of them comprises a monomer M(iii.a). It is also possible that both the monomers M(iii.1) and the monomers M(iii.2) comprise a monomer M(iii.a) and a monomer M(iii.b), while the monomers M(iii.1) comprise at least one further monomer, which is selected from monomers M(iii.cr), M(iii.ac) and monomers M(iii.ni), which is not comprised in the monomers M(iii.2). Preferably, the monomers M(iii.1) comprise at least one monomers M(iii.a).

Preferably, the monomers M(iii.1) comprise one or more crosslinking monomers M(iii.cr), which are preferably present in the monomers M(iii.1) in an amount in the range of 0.01 to 2% b.w., in particular in the range of 0.02 to 1% b.w., especially in the range of 0.05 to 0.5% b.w., based on the total weight of monomers M(iii.1). Preferably, the monomers M(iii.2) do not comprise a crosslinking monomer M(iii.cr) or less than 0.1% b.w. of a crosslinking monomer M(iii.cr), based on the total weight of monomers M(iii.2).

Preferably, the monomers M(iii.1) comprise one or more acidic monomers M(iii.ac), which are preferably present in the monomers M(iii.1) in an amount in the range of 0.05 to 5% b.w., in particular in the range of 0.1 to 2% b.w., especially in the range of 0.1 to 1.0% b.w., based on the total weight of monomers M(iii.1). Preferably, the monomers M(iii.2) do not comprise an acidic monomer M(iii.1.ac) or less than 0.1% b.w. of an acidic monomer M(iii.ac), based on the total weight of monomers M(iii.2). Preferably, the monomers M(iii.1) comprise one or more acidic monomers M(iii.ac), which are selected from the group consisting of monoethylenically unsaturated $C_3$-$C_8$ monocarboxylic acids, in particular acrylic acid or methacrylic acid, and ethylenically unsaturated fatty acids and mixtures thereof. Particular preference is given to mixtures of one or more monoethylenically unsaturated $C_3$-$C_8$ monocarboxylic acids with one or more unsaturated fatty acids such as mixtures of methacrylic acid with linseed-oil fatty acid.

The alkali swellable core of the polymer particles contained in the present invention is formed from monomers M(i) which comprise at least one acidic monomer M(i.ac). The monomers Mi.ac serve to provide sufficient swelling of the polymer core at a pH of at least pH 7.5. Preference is given to acidic monomers M(i.ac) which are selected from the group consisting of monoethylenically unsaturated monomers having at least one carboxylate group, in particular from the group consisting of monoethylenically unsaturated $C_3$-$C_8$ monocarboxylic acids, monoethylenically unsaturated $C_4$-$C_8$ dicarboxylic acids and mixtures thereof, with preference given to monoethylenically unsaturated $C_3$-$C_8$ monocarboxylic acids.

Examples of suitable monomers M(i.ac) include but are not limited to acrylic acid, methacrylic acid, acryloyloxypropionic acid, methacryloyloxypropionic acid, acryloyloxyacetic acid, methacryloyloxyacetic acid, crotonic acid, maleic acid, fumaric acid and itaconic acid. Particularly preferred monomers M(i.ac) are acrylic acid, methacrylic acid, and combinations thereof.

Preferably, the monomers M(i) comprise at least 5% b.w., in particular at least 10% b.w., more particularly at least 15% b.w. and especially at least 20% b.w., based on the total weight of the monomers M(i) of at least one monomer M(i.ac). Preferably, the amount of monomers M(i.ac) will not exceed 60% b.w. and is in particular in the range of 10 to 60% b.w., in particular in the range of 15 to 50% b.w. and especially in the range of 20 to 40% b.w., based on the total amount of monomers M(i) forming the alkali-swellable polymer core.

In addition to the at least one acidic monomer M(i.ac) the monomers M(i) usually comprise at least one monoethylenically unsaturated non-ionic monomer M(i.ni), which has a limited solubility in water and which has in particular a solubility in de-ionized water at 20° C. and 1 bar of at most 50 g/l, in particular a solubility in the range of 5 to 50 g/l.

Suitable monomers M(i.ni) include but are not limited to esters of vinyl alcohol or allyl alcohol with $C_1$-$C_{20}$ monocarboxylic acids, $C_1$-$C_{20}$-alkyl esters of monoethylenically unsaturated $C_3$-$C_8$ monocarboxylic acids, monomers M(iii.a) as defined herein, monovinylaromatic monomers M(iii.b), in particular styrene, and alkenyl nitriles M(iii.c), in particular acrylonitrile, and combinations thereof.

Examples of monomers M(i.ni) include but are not limited to vinyl acetate, vinyl propionate, vinyl butyrate, vinyllaurate, vinylstearate, methyl acrylate, ethyl acrylate, n-propyl acrylate, isopropyl acrylate, n-butyl acrylate, sec-butyl acrylate, tert-butyl acrylate, n-hexyl acrylate, n-heptyl acrylate, n-octyl acrylate, 1,1,3,3-tetramethylbutyl acrylate, 2-ethylhexyl acrylate, n-nonyl methacrylate, n-decyl methacrylate, methyl methacrylate, ethyl methacrylate, n-propyl methacrylate, isopropyl methacrylate, n-butyl methacrylate, sec-butyl methacrylate, tert-butyl methacrylate, n-hexyl methacrylate, n-heptyl methacrylate, n-octyl methacrylate, 1,1,3,3-tetramethylbutyl methacrylate, 2-ethylhexyl methacrylate, n-nonyl methacrylate, n-decyl methacrylate, styrene, acrylonitrile, cyclohexyl acrylate, cyclohexyl methacrylate, cyclohexylmethyl acrylate, cyclohexylmethyl methacrylate, 2-norbornyl acrylate, norbornyl methacrylate, isobornyl acrylate, isobornyl methacrylate, cyclohexylmethyl acrylate, cyclohexylmethyl methacrylate, 1,3-dioxan-5-yl-acrylate, 1,3-dioxan-5-yl-methacrylate, 2,2-dimethyl-1,3-dioxan-5-yl-acrylate, 2,2-dimethyl-1,3-dioxan-5-yl-methacrylate, 1,3-dioxolan-4-yl-methyl acrylate, 1,3-dioxolan-4-ylmethyl methacrylate, 2,2-dimethyl-1,3-dioxolan-4-ylmethyl acrylate, 2,2-dimethyl-1,3-dioxolan-4-ylmethyl methacrylate, oxolan-2-yl-methyl acrylate (tetrahydrofurfuryl acrylate), oxolan-2-yl-methyl methacrylate (tetrahydrofurfuryl methacrylate), 2,5-dioxabicyclo[2,2,1]heptan-7-yl acrylate, 2,5-dioxabicyclo[2,2,1]heptan-7-yl methacrylate and dimethyl itaconate and combinations thereof.

Preferably, the monomers M(i.ni) do not comprise more than 15% b.w., based on the total amount of monomers M(i.ni), of monomers, which are selected from the group consisting of monomers M(iii.a), monomers M(iii.b) and monomers M(iii.c).

Preferably, the monomers M(i.ni) comprise at least 25% b.w., in particular at least 50% b.w., based on the total amount of monomers M(i.ni), of monomers whose homopolymers have a glass transition temperature of at least 60° C. and which are preferably distinct form the monomers M(iii.a), monomers M(iii.b) and monomers M(iii.c).

Preferably, the monomers M(i.ni) are selected from the group of $C_1$-$C_{10}$-alkyl esters of monoethylenically unsaturated $C_3$-$C_8$ monocarboxylic acids and $C_5$-$C_{10}$-cycloalkyl esters of monoethylenically unsaturated $C_3$-$C_8$ monocarboxylic acids, in particular from the group consisting of $C_1$-$C_{10}$-alkyl (meth)acrylates, especially from the group consisting of $C_2$-$C_6$-alkyl acrylates, $C_1$-$C_6$-alkyl methacrylates, and mixtures thereof.

More preferably the at least one monomer M(i.ni) is selected from methyl acrylate, ethyl acrylate, n-butyl acrylate, isobutyl acrylate, tert-butyl acrylate, methyl methacrylate, ethyl methacrylate, n-butyl methacrylate, isobutyl methacrylate, tert-butyl methacrylate, and mixtures thereof. More preferably, the at least one monomer M(i.ni) comprises methyl methacrylate, in particular in an amount of at least 50% b.w., based on the total weight of the monomers M(i.ni).

Preferably, the amount of monomers M(i.ni) will not exceed 90% b.w. and is in particular in the range of 40 to 90% b.w., more particularly in the range of 50 to 85% b.w. and especially in the range of 60 to 80% b.w., based on the total amount of monomers M(i) forming the alkali-swellable polymer core.

With respect to the amount of monomers M(i) forming the alkali swellable polymer core, the total amount of monomers M(i.ac) and monomers M(i.ni) is at least 90% b.w., in particular at least 95% b.w. and especially at least 98% b.w. or 100% b.w. However, the monomers (i) forming the alkali swellable polymer core may contain small amounts of ethylenically unsaturated monomers which are different from monomers M(i.ac) and monomers M(i.ni). For example, the monomers M(i) may comprise up to 1% b.w. of crosslinking monomers as defined in the group of monomers M(iii.cr) and up to 10% b.w. of nonionic monoethylenically unsaturated monomers having a solubility in deionized water at 20° C. and 1 bar of at least 80 g/L, e.g. the monomers M(iii.ni) as defined above.

Preferably, the monomers M(i) do not comprise a crosslinking monomer M(iii.cr) or less than 0.1% b.w. of a crosslinking monomer M(iii.cr), based on the total weight of monomers M(iii.2).

Suitable monomers M(iii.ni), which may be present in the in the monomers M(i) are in particular monoethylenically unsaturated monomers having a carboxamide and include, but are not limited to primary amides of monoethylenically unsaturated monocarboxylic acids having 3 to 6 carbon atoms, such as acrylamide and methacrylamide.

The relative weight of the core polymer with respect to the total weight of the polymer particles is in particular in the range of 4 to 25% b.w., preferably in the range of 5 to 20% b.w. and especially in the range of 6 to 15% b.w., based on the total weight of the polymer particles. Consequently, the relative amount of monomers M(i) is in particular in the range of 4 to 25% b.w., preferably in the range of 5 to 20% b.w. and especially in the range of 6 to 15% b.w., based on the total weight of the monomers forming polymer particles.

The voided polymer particles of the aqueous polymer dispersion of the present invention also comprise an intermediate polymer layer formed by polymerized ethylenically unsaturated monomers M(ii). The intermediate layer is arranged on the surface of the polymer core and beneath the polymer shell and servers for better compatibility between the polymer core and the polymer shell. It is therefore also referred to as tie coat.

The tie coat is typically formed by the monomers known for forming the tie coat from the prior art references cited in the introductory part.

Usually, the monomers M(ii) comprise at least 90% b.w., in particular at least 95% b.w. of one or more non-ionic monoethylenically unsaturated monomers M(ii.a) having a solubility in deionized water at 20° C. and 1 bar of at most 50 g/L, in particular in the range of 0.1 to 40 g/L.

Suitable monomers M(ii.a) include but are not limited to esters of vinyl alcohol or allyl alcohol with $C_1$-$C_{20}$ monocarboxylic acids, $C_1$-$C_{20}$-alkyl esters of monoethylenically unsaturated $C_3$-$C_8$ monocarboxylic acids, monomers M(iii.a) as defined herein, monovinylaromatic monomers M(iii.b), in particular styrene and combinations thereof.

Examples of monomers M(ii.a) include but are not limited to vinyl acetate, vinyl propionate, vinyl butyrate, vinyllaurate, vinylstearate, methyl acrylate, ethyl acrylate, n-propyl acrylate, isopropyl acrylate, n-butyl acrylate, sec-butyl acrylate, tert-butyl acrylate, n-hexyl acrylate, n-heptyl acrylate, n-octyl acrylate, 1,1,3,3-tetramethylbutyl acrylate, 2-ethylhexyl acrylate, n-nonyl methacrylate, n-decyl methacrylate, methyl methacrylate, ethyl methacrylate, n-propyl methacrylate, isopropyl methacrylate, n-butyl methacrylate, sec-butyl methacrylate, tert-butyl methacrylaten-hexyl methacrylate, n-heptyl methacrylate, n-octyl methacrylate, 1,1,3,3-tetramethylbutyl methacrylate, 2-ethylhexyl methacrylate, n-nonyl methacrylate, n-decyl methacrylate, styrene, cyclohexyl acrylate, cyclohexyl methacrylate, 2-norbornyl acrylate, norbornyl methacrylate, isobornyl acrylate, isobornyl methacrylate, cyclohexylmethyl acrylate, cyclohexylmethyl methacrylate, 1,3-dioxan-5-yl-acrylate, 1,3-dioxan-5-yl-methacrylate, 2,2-dimethyl-1,3-dioxan-5-yl-acrylate, 2,2-dimethyl-1,3-dioxan-5-yl-methacrylate, 1,3-dioxolan-4-yl-methyl acrylate, 1,3-dioxolan-4-ylmethyl methacrylate, 2,2-dimethyl-1,3-dioxolan-4-ylmethyl acrylate, 2,2-dimethyl-1,3-dioxolan-4-ylmethyl methacrylate, oxolan-2-yl-methyl acrylate (tetrahydrofurfuryl acrylate), oxolan-2-yl-methyl methacrylate (tetrahydrofurfuryl methacrylate), 2,5-dioxabicyclo[2,2,1]heptan-7-yl acrylate, 2,5-dioxabicyclo[2,2,1]heptan-7-yl methacrylate and dimethyl itaconate and combinations thereof.

Preferably, the monomers M(ii.a) do not comprise more than 25% b.w., based on the total amount of monomers M(ii.a), of monomers M(iii.b).

Preferably, the monomers M(ii.a) comprise at least 25% b.w., in particular at least 50% b.w., based on the total amount of monomers M(ii.a), of monomers whose homopolymers have a glass transition temperature of at least 60° C. and which are preferably distinct form the monomers M(iii.b).

Preferably, the monomers M(ii.a) are selected from the group consisting of $C_1$-$C_{20}$-alkyl esters of acrylic acid, $C_1$-$C_{20}$-cycloalkyl esters of methacrylic acid, $C_5$-$C_{20}$-cycloalkyl esters of acrylic acid, $C_5$-$C_{20}$-cycloalkyl esters of methacrylic acid and combinations thereof. In particular, the monomers M(ii.a) are selected from the group consisting of $C_1$-$C_{10}$-alkyl esters of monoethylenically unsaturated $C_3$-$C_8$ monocarboxylic acids and $C_5$-$C_{10}$-cycloalkyl esters of monoethylenically unsaturated $C_3$-$C_8$ monocarboxylic acids, more particularly from the group consisting of $C_1$-$C_{10}$-alkyl (meth)acrylates, especially from the group consisting of $C_2$-$C_6$-alkyl acrylates, $C_1$-$C_6$-alkyl methacrylates, and mixtures thereof.

More preferably the monomers M(ii.a) are selected from the group consisting of ethyl acrylate, n-butyl acrylate, isobutyl acrylate, tert-butyl acrylate, methyl methacrylate, ethyl methacrylate, n-butyl methacrylate, isobutyl methacrylate, tert-butyl methacrylate, and mixtures thereof. More preferably, the monomers M(ii.a) comprise methyl methacrylate, in particular in an amount of at least 50% b.w., based on the total weight of the monomers M(ii.a). Especially, the monomers M(ii.a) comprise a combination of methyl methacrylate with at least one $C_2$-$C_6$-alkyl acrylate. In this combination, the amount of methyl methacrylate is in particular in the range of 50 to 95% b.w. and the amount of $C_2$-$C_6$-alkyl acrylate is in particular in the range of 5 to 50% b.w., based on the total weight of the monomers M(ii.a).

The monomers M(ii) may comprise minor amounts of one or more other monomers, which are different from the monomers M(ii.a). Such monomers include e.g. crosslinking monomers M(ii.cr), ethylenically unsaturated acidic monomers M(ii.ac) and monoethylenically unsaturated non-ionic monomers M(ii.ni) which have a solubility in deionized water at 20° C. and 1 bar of at least 80 g/l.

Preferably, the monomers M(ii) forming the tie coat comprise at least one monomer M(ii.cr). Typical crosslinking monomers M(ii.cr) are those mentioned as monomers M(iii.cr). The amount of monomers M(ii.cr) will typically not exceed 2% b.w. in particular 1% b.w. and especially 0.5% b.w., based on the total weight of monomers M(ii). If present, the amount of monomers M(ii.cr) is typically in the range of 0.01 to 2% b.w., in particular in the range of 0.02 to 1% b.w., especially in the range of 0.05 to 0.5% b.w., based on the total weight of monomers M(ii).

Examples of monomers M(ii.Cr) include:

- diesters of monoethylenically unsaturated $C_3$-$C_6$ monocarboxylic acids with saturated aliphatic or cycloaliphatic diols, in particular diesters of acrylic acid or methacrylic acid, such as the diacrylates and the dimethacrylates of ethylene glycol (1,2-ethanediol), propylene glycol (1,2-propanediol), 1,2-butanediol, 1,3-butanediol, 1,4-butanediol, neopentyl glycol (2,2-dimethyl-1,3-propanediol), 1,6-hexanediol and 1,2-cyclohexanediol;
- monoesters of monoethylenically unsaturated $C_3$-$C_6$ monocarboxylic acids with monoethylenically unsaturated aliphatic or cycloaliphatic monohydroxy compounds, such as the acrylates and the methacrylates of vinyl alcohol (ethenol), allyl alcohol (2-propen-1-ol), 2-cyclohexen-1-ol or norbornenol, such as vinyl acrylate, vinyl methacrylate, allyl acrylate and allyl methacrylate;
- vinyl and allyl ethers of polyols, such as butanediol divinyl ether, trimethylolpropane trivinyl ether, pentaerythritol triallyl ether, triallylsucrose, pentaallylsaccharose and pentaallylsucrose,
- vinyl and allyl urea compounds, such as divinylethylene urea, divinylpropylene urea, and triallyl cyanurate;
- polyunsaturated silicon compounds such as tetraallylsilane, tetravinylsilane and bis- or tris(meth)acryloylsiloxanes; and
- divinyl aromatic compounds, such as 1,3-divinyl benzene, 1,4-divinyl benzene.

Preferably, the monomers M(ii) forming the tie coat comprise at least one monomer M(ii.ac). Typical acidic monomers M(ii.ac) are those mentioned as monomers M(iii.ac). The acidic monomers may be present in their acidic form or in their salt form. The amount of acidic monomers M(ii.ac) will typically not exceed 5% b.w. in particular 2% b.w. and especially 1% b.w., based on the total weight of monomers M(ii). If present, the amount of monomers M(ii.ac) is typically in the range of 0.05 to 5% b.w., in particular in the range of 0.1 to 2% b.w., especially in the range of 0.1 to 1.0% b.w., based on the total weight of monomers M(iii).

Monomers M(ii.ac) are preferably selected from the group consisting of monoethylenically unsaturated $C_3$-$C_8$ monocarboxylic acids, monoethylenically unsaturated $C_4$-$C_8$ dicarboxylic acids, the monomethyl esters of monoethylenically unsaturated $C_4$-$C_8$ dicarboxylic acids and ethylenically unsaturated fatty acids.

Examples of monomers M(ii.ac) include but are not limited to acrylic acid, methacrylic acid, acryloyloxypropionic acid, methacryloyloxypropionic acid, acryloyloxyacetic acid, methacryloyloxyacetic acid, crotonic acid, maleic acid, fumaric acid and itaconic acid, oleic acid, ricinoleic acid, palmitoleic acid, elaidic acid, vaccenic acid, icosenoic acid, cetoleic acid, erucic acid, nervonic acid, arachidonic acid, timnodonic acid, clupanodonic acid and mixtures of ethylenically unsaturated fatty acids obtained from saponification of plant oils such as linseed oil fatty acid.

Amongst the monomers M(ii.ac) preference is given to monoethylenically unsaturated $C_3$-$C_8$ monocarboxylic acids, in particular to acrylic acid and methacrylic acid, especially to methacrylic acid and to mixtures of monoethylenically unsaturated $C_3$-$C_8$ one or more monoethylenically unsaturated $C_3$-$C_8$ monocarboxylic acids with one or more unsaturated fatty acids such as mixtures of methacrylic acid with linseed-oil fatty acid.

The monomers M(ii) forming the tie coat comprise at least one monomer M(ii.ni). Typical acidic monomers M(ii.ni) are those mentioned as monomers M(iii.ni). The amount of monomers M(ii.ni) will typically not exceed 5% b.w. in particular 2% b.w. and especially 1% b.w., based on the total weight of monomers M(ii). If present, the amount of monomers M(ii.ni) is typically in the range of 0.05 to 5% b.w., in particular in the range of 0.1 to 2% b.w., especially in the range of 0.1 to 1.0% b.w., based on the total weight of monomers M(ii).

The relative weight of the intermediate polymer layer with respect to the total weight of the polymer particles is in particular in the range of 1 to 15% b.w., preferably in the range of 2 to 10% b.w. and especially in the range of 3 to 8% b.w., based on the total weight of the polymer particles. Consequently, the relative amount of monomers M(ii) is in particular in the range of 1 to 15% b.w., preferably in the range of 2 to 10% b.w. and especially in the range of 3 to 8% b.w., based on the total weight of the monomers forming polymer particles.

For the purposes of the invention it has been found beneficial if the polymer particles contained in the polymer dispersion have a volume median particle diameter of at least 150 nm, as determined by hydrodynamic chromatography and preferably of at least 200 nm. The volume median particle diameter is also termed the Dv50 particle diameter or d(v, 0.5) particle diameter. Preferably, the volume median diameter of the copolymer particles in the polymer dispersion is in the range from 150 to 1500 nm, in particular in the range from 200 to 1000 nm, and specifically in the range from 200 to 800 nm. Where the polymer dispersions are used for paint formulations, the volume median particle diameter is typically in the range of 150 to 600 nm, for use in paper and in cosmetics it is typically in the range of 200 to 1500 nm, and for foams it is typically in the range of 300 to 1000 nm.

The median particle size as well as the distribution of particle size may also be determined by Hydrodynamic Chromatography fractionation (HDC), as for example described by H. Wiese, "Characterization of Aqueous Polymer Dispersions" in Polymer Dispersions and Their Industrial Applications (Wiley-VCH, 2002), pp. 41-73. In particular, the volume median particle diameter is determined according to the following protocol:

The volume-based particle size distributions of the polymer latexes were measured by capillary hydrodynamic fractionation, also referred to hydrodynamic chromatography (HDC) with a "CHDF3000" device from Matec Applied Sciences, USA, using as column a "PL-PSDA cartridge, Type-2" of Agilent Technologies, USA. Each sample was first diluted to a solids content of 1% b.w., filtered through a filter with pore size 1.2 μm and injected with an autosampler with an injection volume of 25 μL For further details, reference is made to the examples and the description below. The HDC method provides particle sizes comparable or almost identical to the particle sizes provided by the QELS method. While in the low particle size range the values are identical within the limits of measurement accuracy at higher particle sizes the values may differ by 10% or less than 15 nm. Typically, the values provided by the HDC method are somewhat higher than the values provided by the QELS method.

The volume median particle size as well as the distribution of particle size given herein refers to the values determined by quasi-elastic light scattering (QELS), also known as dynamic light scattering (DLS). The measurement method is described in the ISO 13321:1996 standard.

The determination of the particle size distribution, and thus the Z-average particle diameter, by QELS can be carried out using a High-Performance Particle Sizer (HPPS). For this purpose, a sample of the aqueous polymer latex will be diluted, and the dilution will be analyzed. In the context of QELS, the aqueous dilution may have a polymer concentration in the range from 0.001 to 0.5% b.w., depending on the particle size. For most purposes, a proper concentration will be 0.01% b.w. However, higher or lower concentrations may be used to achieve an optimum signal/noise ratio. The dilution can be achieved by addition of the polymer latex to water or an aqueous solution of a surfactant in order to avoid flocculation. Usually, dilution is performed by using a 0.1% b.w. aqueous solution of a non-ionic emulsifier, e.g. an ethoxylated C16/C18 alkanol (degree of ethoxylation of 18), as a diluent. Measurement configuration: HPPS from Malvern, automated, with continuous-flow cuvette and Gilson autosampler. Parameters: measurement temperature 20.0° C.; measurement time 120 seconds (6 cycles each of 20 s); scattering angle 173°; wavelength laser 633 nm (HeNe); refractive index of medium 1.332 (aqueous); viscosity 0.9546 mPa-s. The measurement gives an average value of the second order cumulant analysis (mean of fits), i.e. Z-average. The "mean of fits" is an average, intensity-weighted hydrodynamic particle diameter in nm.

The particle size distribution of the copolymer particles contained in the polymer latex may be monomodal, which means that the distribution function of the particle size has a single maximum, or polymodal, in particular bimodal, which means that the distribution function of the particle size has at least two maxima. Generally, the particle size distribution of the polymer particles in the polymer dispersion obtainable by the process, as described herein, is monomodal or almost monomodal.

The aqueous polymer dispersion of the present invention typically contain water capured in the voided polymer particles. The amount of captured water is also referred to as the internal water content. The relative internal water content is the fraction of the water in the interior of the voided polymer particles, based on the total water content of the polymer latex. The relatve internal water content can be determined by a pulsed field gradient $^1H$ NMR experiment. The measurement method is described in more detail in the Examples section. Preferably, the aqueous polymer dispersions have a relative internal water content in the range of 15 to 45% b.w., in particular in the range of 20% to 40%, especially in the range of 25% to 35%, based on the total water content of the polymer dispersion.

The total solids content of the aqueous polymer dispersion, i.e. the amount of polymer, is typically in the range of 10 to 50% b.w. in particular in the range of 15 to 45% b.w., based on the total weight of the polymer disperson.

The polymer dispersions of the present invention can be prepared by conventional sequential aqueous emulsion polymerization techniques well known to a skilled person in the art. In particular, the polymer dispersions of the present invention can be prepared by analogy to the aqueous emulsion polymerization methods described in WO 2007/050326, EP 2511312, WO 2015/024835, WO 2016/028512, WO 2018/065571, EP 3620476 and EP 3620493, respectively, to which full reference is made.

In a first step (i), an aqueous polymer dispersion of the polymer particles of polymerized ethylenically unsaturated monomers M(i), is provided. The aqueous polymer dispersion provided in step (i) is also referred to as a swell core or swelling core, respectively, and has a pH value of less than pH 7, in particular a pH in the range of pH 2 to pH 6.5.

Preferably, the volume median of the particle size, determined by hydrodynamic fractionation, of the swelling core particles in the polymer dispersion provided in step (i) in the unswollen state, i.e. at a pH of below 7, in particular below 6.5, is in the range from 50 to 300 nm.

The solids content of the aqueous polymer dispersion, provided in step (i) is typically in the range of 10 to 50% b.w. in particular in the range of 15 to 40% b.w., based on the total weight of the polymer disperson.

The aqueous polymer dispersion of step (i) is generally provided by an emulsion polymerization, in particular a free-radical emulsion polymerization of the monomers M(i). For this, the monomers M(i) are polymerized in an aqueous medium in the presence of a polymerization initiator and a surfactant in a manner well known to a skilled person.

The emulsion polymerization of the monomers M(i) may be carried out by a batch procedure, where an aqueous emulsion of the monomers M(i) are charged to the polymerization vessel and then polymerization is initiated by establishing polymerization conditions followed by the addition of a polymerization initiator. Preferably the emulsion polymerization of the monomers M(i) performed by a so-called monomer feed process, which means that at least 80% b.w. or the total amount of the monomers M(i) to be polymerized are fed into the polymerization reaction under polymerization conditions.

Here and in the following, the term “polymerization conditions” is well understood to mean those temperatures under which the aqueous emulsion polymerization proceeds at sufficient polymerization rate. The temperature depends particularly on the polymerization initiator, its concentration in the reaction mixture and the reactivity of the monomers. Suitable polymerization conditions can be determined by routine. In case of a free-radical aqueous emulsion polymerization, the polymerization is initiated by a so called free-radical initiator, which is a compound that decomposes to form free radicals, which initiate the polymerization of the monomers. Advantageously, the type and amount of the free-radical initiator, polymerization temperature and polymerization pressure are selected such that a sufficient number of initiating radicals is always present to initiate or to maintain the polymerization reaction.

The monomers M(i) may be polymerized in the presence of a seed latex. A seed latex is a polymer dispersion which is present in the aqueous polymerization medium before the polymerization of the monomers M(i) is started. The seed latex may help to better adjust the particle size of the polymer dispersion provided in step (i). The amount of seed latex used for this purpose is usually in the range of 0.1 to 20% b.w., preferably in the range of 0.5 to 18% b.w., especially in the range of 1 to 18% b.w., based of the total weight of the monomers M(i) and calculated as polymer solids of the seed latex.

Principally, every polymer latex may serve as a seed latex. For the purpose of the invention, preference is given to seed latices, where the Z-average particle diameter of the polymer particles of the seed latex, as determined by dynamic light scattering at 20° C. (see above) is preferably in the range from 10 to 100 nm, in particular form 10 to 60 nm. Preferably, the polymer particles of the seed latex is made of ethylenically unsaturated monomers, which comprise at least 95% b.w., based on the total weight of the monomers forming the seed latex, of one or more monomers M(i.ni) as defined above. Specifically, preferred seed latices are polystyrene latices and latices containing at least 90% b.w. of polymerized methyl methacrylate.

For further details of step (i) we refer to WO 2007/050326, EP 2511312, WO 2015/024835, WO 2016/028512, WO 2018/065571, EP 3620476 and EP 3620493, in particular to the examples described therein.

In a second step, the monomers M(ii) are subjected to a radical aqueous emulsion polymerization in the aqueous polymer dispersion obtained in step (i) at a pH value of less than pH 7, preferably at a pH value in the range of pH 2 to pH 6.5. Thereby an aqueous polymer dispersion is obtained, wherein the polymer particles have an alkali swellable polymer core of polymerized ethylenically unsaturated monomers M(i) and an intermediate layer of polymerized monomers M(ii).

The emulsion polymerization of step (ii) is preferably carried out as a free-radical emulsion polymerization of the monomers M(ii). For this, the monomers M(ii) are polymerized in the aqueous polymer dispersion of step (i) in the presence of a polymerization initiator and a surfactant in a manner well known to a skilled person.

The emulsion polymerization of the monomers M(ii) may be carried out by a batch procedure, where an aqueous emulsion of the monomers M(ii) is charged to the polymerization vessel containing the polymer dispersion of step (i) and then polymerization is initiated by establishing polymerization conditions followed by the addition of a polymerization initiator. Preferably, the emulsion polymerization of the monomers M(ii) performed by a so-called monomer feed process, which means that at least 80% b.w., or the total amount of the monomers M(ii) to be polymerized in step (ii) are fed into the polymerization reaction under polymerization conditions, i.e. they are fed into the polymerization vessel containing the aqueous polymer dispersion obtained in step (i) under polymerization conditions.

For further details of step (ii) reference is made to WO 2007/050326, EP 2511312, WO 2015/024835, WO 2016/028512, WO 2018/065571, EP 3620476 and EP 3620493, in particular to the examples described therein.

In the aqueous polymer dispersion obtained in step (ii) polymer particles have a core-shell structure, where the core corresponds to the swelling core formed by polymerized monomers M(i) and the polymer shell is formed by the polymerized monomers M(ii). The polymer shell will later form the intermediate polymer layer and is also referred to as tie coat. The weight ratio of the swelling core to the polymer shell/tie coat, i.e. weight ratio of polymerized monomers M(i) to polymerized monomers M(ii) is typically in the range of 1:2 to 5:1 and in particular in the range of 1:1 to 3:1.

Typically, the polymer dispersion obtained in step (ii) has a pH value of less than pH 7, in particular a pH in the range of pH 2 to pH 6.5.

Preferably, the volume median of the particle size, determined by hydrodynamic fractionation, of the swelling core particles in the polymer dispersion obtained in step (ii) in the unswollen state, i.e. at a pH of below 7, in particular below 6.5, is in the range from 60 to 350 nm.

The solids content of the aqueous polymer dispersion, obtained in step (ii) is typically in the range of 10 to 50% b.w. in particular in the range of 15 to 40% b.w., based on the total weight of the polymer disperson.

In a third step, the monomers M(iii) are subjected to a radical aqueous emulsion polymerization in the aqueous polymer dispersion of the polymer particles obtained in step (ii).

The emulsion polymerization of step (iii) is preferably carried out as a free-radical emulsion polymerization of the monomers M(iii). For this, the monomers M(iii) are polymerized in the aqueous polymer dispersion of step (iii) in the presence of a polymerization initiator and a surfactant in a manner well known to a skilled person.

The emulsion polymerization of the monomers M(iii) may be carried out by a batch procedure, where an aqueous emulsion of the monomers M(iii) is charged to the polymerization vessel containing the polymer dispersion of step (ii) and then polymerization is initiated by establishing polymerization conditions followed by the addition of a polymerization initiator. Preferably, the emulsion polymerization of the monomers M(iii) performed by a so-called monomer feed process, which means that at least 80% b.w., or the total amount of the monomers M(iii) to be polymerized in step (iii) are fed into the polymerization reaction under polymerization conditions, i.e. they are fed into the polymerization vessel containing the aqueous polymer dispersion obtained in step (ii) under polymerization conditions.

Step (iii) can be carried out by analogy to the methods described in WO 2007/050326, EP 2511312, WO 2015/024835, WO 2016/028512, WO 2018/065571, EP 3620476 and EP 3620493 using the monomers M(iii) instead of the monomers described therein.

The process of the invention also comprises a neutralization step (iv), where the polymer dispersion is neutralized to a pH value of at least pH 7.5, in particular to a pH value of at least 7.8 and especially at least 8.0, e.g. to a pH value in the range of 7.5 to 13, in particular in the range of 7.8 to 12 and especially in the range of 8.0 to 11.5. By the neutralization, the anionic groups of the polymerized monomers M(i.ac) contained in the swelling core are neutralized, i.e. transferred into their anionic form. Thus, due to osmosis the water of the polymer dispersion migrates into the core and swells it.

Neutralization is effected by addition of a suitable base. Suitable bases include but are not limited to alkali metal hydroxide, alkali metal carbonates, alkaline earth metal oxides, alkaline earth metal hydroxides, ammonia, and organic amines including primary amines, secondary amines and tertiary amines.

Suitable alkali metal or alkaline earth metal compounds are sodium hydroxide, potassium hydroxide, calcium hydroxide, magnesium oxide and sodium carbonate.

Suitable amines include but are not limited to

- mono-, di- and tri-$C_1$-$C_6$-alkylamines such as ethylamine, n-propylamine, monoisopropylamine, n-butylamine, hexylamine, dimethylamine, diethylamine, di-n-propylamine and tributylamine;
- mono-, di- and tri-$C_2$-$C_6$-alkanolamines and N—$C_1$-$C_6$alkyl- und N,N—$C_1$-$C_6$-dialkyl-$C_2$-$C_6$-alkanolamines, such as ethanolamine, diethanolamine, triethanolamine, diisopropanolamine and dimethylethanolamine;
- mono-, di- and tri-($C_1$-$C_3$-alkoxy-$C_2$-$C_6$-alkyl)amines, such as 2-ethoxyethylamine, and 3-ethoxypropylamine;
- cyclic amines such as morpholine,
- di-amines such as ethylenediamine, 2-diethylaminethylamine, 2,3-diaminopropane, 1,3-propylenediamine, dimethylaminopropylamine, neopentanediamine, hexamethylenediamine, 4,9-dioxadodecane-1,12-diamine, and mixtures thereof.

Neutralization is carried out preferably with ammonia or sodium hydroxide.

The neutralization step of step (iv) may be carried out in the aqueous polymer dispersion obtained in step (ii) before starting the polymerization of the monomers M(iii) but it may also be carried out after having completed the polymerization of the monomers M(iii). It may also be carried out during step (iii).

For efficiency of encapsulation of the polymer particles of the polymer dispersion obtained in step (ii) by the polymer formed by the polymerized monomers M(iii), it is preferred that at least a portion of the monomers M(iii) to be polymerized in step (iii) has been polymerized before the neutralization of step (iv) is carried out, which is particularly preferred.

Therefore, a particularly preferred group of embodiments of the invention relates to a process as defined herein, wherein steps (iii) and (iv) are carried out in the following order:

- (iii.1) a first radical emulsion polymerization of monomers M(iii.1), as defined above, at a pH of less than pH 7, in particular in the range of pH 2 to pH 6.5;
- (iv) a neutralization of the polymer dispersion obtained in step (iii.1) to a pH of at least pH 7.5, in particular to a pH of at least 7.8 and especially at least 8.0, e.g. to a pH value in the range of 7.5 to 13, in particular in the range of 7.8 to 12 and especially in the range of 8.0 to 11.5; and
- (iii.2) a second radical emulsion polymerization of monomers M(iii.2) as defined above in the presence of the polymer dispersion obtained in step (iv) at a pH of at least pH 7.5, in particular at a pH of at least 7.8 and especially at a pH of least 8.0 and especially at least 8.0, e.g. to a pH value in the range of 7.5 to 13, in particular in the range of 7.8 to 12 and especially in the range of 8.0 to 11.5.

It was found beneficial that the polymerization is somehow suppressed or interrupted during the neutralization. This can be achieved by the following measures and combinations thereof:

- (a) a monomer is added which does not homopolymerize and/or has ceiling temperature of less than 181° C., in particular less than 110° C.;
- (b) the polymerization has been stopped by addition of a polymerization inhibitor and/or a reducing agent;
- (c) waiting for a sufficient time for there to be no longer any significant number of free radicals present, on account of termination thereof, the cooling of the reactor contents to limit the reactivity of the free radicals and also the formation of new radicals.

Preference is given to the measures (a) and (b). Therefore, it is beneficial, if the neutralization is carried out in the presence of a radical scavenger or a monoethylenically unsaturated monomer, which is not capable of undergoing a radical homopolymerization.

Suitable monoethylenically unsaturated monomer, which is not capable of undergoing a radical homopolymerization are the aforementioned plasticizer monomers M(iii.p), which preferably have a ceiling temperature of less than 181° C., in particular less than 110° C. Typical plasticizer monomers include 2-propenylaromatic hydrocarbons, di- and trisubstituted olefins having 4 to 8 carbon atoms, such as 2-methyl-2-butene and 2,3-dimethyl-2-butene, 1,1-diphenylethene, $C_1$-$C_{10}$-alkyl esters of 2-(branched $C_3$-$C_6$ alkyl) acrylic acid, such as $C_1$-$C_{10}$-alkyl esters of 2-(tert-butyl) acrylic acid, $C_1$-$C_{10}$-alkyl esters of 2-phenylacrylic acid (atropic acid), and mixtures thereof. In particular, the plasticizer monomer is selected from 2-propenylaromatic hydrocarbons, such as alpha-methylstyrene.

If step (iv) is carried out in the presence of a plasticizer monomer M(iii.p), the fraction of the plasticizer monomer is usually in the range from 0.5 to 20 wt %, in particular in the range of 1.0 to 10.0 wt %, based on the total weight of the monomers M(iii).

Suitable polymerization inhibitors include N,N-diethylhydroxylamine, N-nitrosodiphenylamine, 2,4-dinitrophenylhydrazine, p-phenylenediamine, phenathiazine, alloocimene, triethyl phosphite, 4-nitrosophenol, 2-nitrophenol, p-aminophenol, 4-hydroxy-TEMPO (also known as 4-hydroxy-2,2,6,6-tetramethyl-piperidinyloxy, free radical), hydroquinone, p-methoxyhydroquinone, tert-butyl-p-hydroquinone, 2,5-di-tert-butyl-p-hydroquinone, 1,4-naphthalenediol, 4-tert-butyl-1-catechol, copper sulfate, copper nitrate, cresol, and phenol.

Typical reducing agents are reductive sulfur compounds, examples being bisulfites, sulfites, sulfinates, thiosulfates, dithionites, and tetrathionates of alkali metals and ammonium compounds and their adducts such as sodium hydroxymethylsulfinates and acetone bisulfites, and also reductive polyhydroxy compounds such as carbohydrates and derivatives thereof such as, for example, ascorbic acid, isoascorbic acid, and their salts (e.g. sodium erythorbate). If used, the polymerization inhibitors or reducing agents are added in an effective amount which halts essentially any polymerization, generally 25 to 5000 parts per million ("ppm"), preferably 50 to 3500 ppm, based on the monomers M(iii). The polymerization inhibitors(s) or reducing agent(s) are preferably added, while the multistage polymer is at or below the temperature at which the shell stage polymer has been polymerized.

As mentioned before, the free-radically initiated aqueous emulsion polymerisation of steps (i), (ii) and (iii) is typically triggered by means of a free-radical polymerisation initiator (free-radical initiator). These may, in principle, be peroxides or azo compounds. Of course, redox initiator systems are also useful. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl or di-cumyl peroxide. Azo compounds used are essentially 2,2'-azobis (isobutyronitrile), 2,2'-azobis(2,4-dimethylvaleronitrile) and 2,2'-azobis(amidinopropyl) dihydrochloride (AIBA, corresponds to V-50 from Wako Chemicals). Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

Preferred free-radical initiators are inorganic peroxides, especially peroxodisulfates, and redox initiator systems.

In general, the amount of the free-radical initiator used, based on the amount of monomers M(i), M(ii) and M(iii), respectively, polymerized in the respective step (i), step (ii) and step (iii), is 0.01 to 3% b.w., preferably 0.1 to 2% b.w.

The amount of free-radical initiator required in the process of the invention for the emulsion polymerisation can be initially charged in the polymerisation vessel completely. However, it is preferred to charge none of or merely a portion of the free-radical initiator, for example not more than 30% b.w., especially not more than 20% b.w., based on the total amount of the free-radical initiator required in the aqueous polymerisation medium and then, under polymerisation conditions, during the free-radical emulsion polymerisation of the monomers M(i), M(ii) and M(iii), respectively, to add the entire amount or any remaining residual amount, according to the consumption, batchwise in one or more portions or continuously with constant or varying flow rates.

The free-radical aqueous emulsion polymerisation of steps (i), (ii) and (iii) is usually conducted at temperatures in the range from 0 to +170° C. Temperatures employed are frequently in the range from +50 to +120° C., in particular in the range from +60 to +120° C. and especially in the range from +70 to +110° C.

The free-radical aqueous emulsion polymerisation of steps (i), (ii) and (iii) can be conducted at a pressure of less than, equal to or greater than 1 atm (atmospheric pressure), and so the polymerisation temperature may exceed +100° C. and may be up to +170° C. Polymerisation of the monomers is normally performed at ambient pressure, but it may also be performed under elevated pressure. In this case, the pressure may assume values of 1.2, 1.5, 2, 5, 10, 15 bar (absolute) or even higher values. If emulsion polymerisations are conducted under reduced pressure, pressures of 950 mbar, frequently of 900 mbar and often 850 mbar (absolute) are established. Advantageously, the free-radical aqueous emulsion polymerisation of the invention is conducted at ambient pressure (about 1 atm) with exclusion of oxygen, for example under an inert gas atmosphere, for example under nitrogen or argon.

The polymerisation of the monomers M(i), M(ii) and M(iii), respectively, can optionally be carried in the presence of chain transfer agents. Chain transfer agents are understood to mean compounds that transfer free radicals, and which reduce the molecular weight of the growing chain and/or which control chain growth in the polymerisation.

Examples of chain transfer agents are aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and the isomeric compounds thereof, n-octanethiol and the isomeric compounds thereof, n-nonanethiol and the isomeric compounds thereof, n-decanethiol and the isomeric compounds thereof, n-undecanethiol and the isomeric compounds thereof, n-dodecanethiol and the isomeric compounds thereof, n-tridecanethiol and isomeric compounds thereof, substituted thiols, for example 2-hydroxyethanethiol, aromatic thiols such as benzenethiol, ortho-, meta- or para-methylbenzenethiol, alkyl esters of mercaptoacetic acid (thioglycolic acid), such as 2-ethylhexyl thioglycolate, alkyl esters of mercaptopropionic acid, such as octyl mercapto propionate, and also further sulfur compounds described in Polymer Handbook, 3rd edition, 1989, J. Brandrup and E. H. Immergut, John Wiley & Sons, section II, pages 133 to 141, but also aliphatic and/or aromatic aldehydes, such as acetaldehyde, propionaldehyde and/or benzaldehyde, unsaturated fatty acids, such as oleic acid, dienes having nonconjugated double bonds, such as divinylmethane or vinylcyclohexane, or hydrocarbons having readily abstractable hydrogen atoms, for example toluene.

Alternatively, it is possible to use mixtures of the aforementioned chain transfer agents that do not disrupt one another. The total amount of chain transfer agents optionally used in the process of the invention, based on the total amount of monomers M, will generally not exceed 1% b.w., in particular 05% b.w., amount of monomers M(i), M(ii) and M(iii), respectively, polymerized in the respective step (i), step (ii) and step (iii).

The aqueous emulsion polymerization of respective steps (i), step (ii) and step (iii) is usually performed in an aqueous polymerisation medium, which as well as water, comprises at least one surface-active substance, so-called surfactants. Suitable surfactants typically comprise emulsifiers and provide micelles, in which the polymerisation occurs, and which serve to stabilize the monomer droplets during aqueous emulsion polymerisation and also growing polymer particles. The surfactants used in the emulsion polymerisation are usually not separated from the polymer dispersion but remain in the aqueous polymer dispersion obtainable by the process of the present invention.

The surfactant may be selected from emulsifiers and protective colloids. Protective colloids, as opposed to emulsifiers, are understood to mean polymeric compounds having molecular weights above 2000 Daltons, whereas emulsifiers typically have lower molecular weights. The surfactants may be anionic or nonionic or mixtures of non-ionic and anionic surfactants.

Anionic surfactants usually bear at least one anionic group, which is selected from phosphate, phosphonate, sulfate and sulfonate groups. The anionic surfactants, which bear at least one anionic group, are typically used in the form of their alkali metal salts, especially of their sodium salts or in the form of their ammonium salts.

Preferred anionic surfactants are anionic emulsifiers, in particular those, which bear at least one sulfate or sulfonate group. Likewise, anionic emulsifiers, which bear at least one phosphate or phosphonate group may be used, either as sole anionic emulsifiers or in combination with one or more anionic emulsifiers, which bear at least one sulfate or sulfonate group.

Examples of anionic emulsifiers, which bear at least one sulfate or sulfonate group, are, for example,

- the salts, especially the alkali metal and ammonium salts, of alkyl sulfates, especially of $C_8$-$C_{22}$-alkyl sulfates,
- the salts, especially the alkali metal and ammonium salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40,
- the salts, especially the alkali metal and ammonium salts, of sulfuric monoesters of ethoxylated alkylphenols, especially of sulfuric monoesters of ethoxylated $C_4$-$C_{13}$-alkylphenols (EO level preferably 3 to 40),
- the salts, especially the alkali metal and ammonium salts, of alkylsulfonic acids, especially of $C_8$-$C_{22}$-alkylsulfonic acids,
- the salts, especially the alkali metal and ammonium salts, of dialkyl esters, especially di-$C_4$-$C_{13}$-alkyl esters of sulfosuccinic acid,
- the salts, especially the alkali metal and ammonium salts, of alkylbenzenesulfonic acids, especially of $C_4$-$C_{22}$-alkylbenzenesulfonic acids, and
- the salts, especially the alkali metal and ammonium salts, of mono- or disulfonated, alkyl-substituted diphenyl ethers, for example of bis(phenylsulfonic acid) ethers bearing a $C_4$-$C_{24}$-alkyl group on one or both aromatic rings. The latter are common knowledge, for example from U.S. Pat. No. 4,269,749, and are commercially available, for example as Dowfax® 2A1 (Dow Chemical Company).

Also suitable are mixtures of the aforementioned salts.

Preferred anionic surfactants are anionic emulsifiers, which are selected from the following groups:

- the salts, especially the alkali metal and ammonium salts, of alkyl sulfates, especially of $C_8$-$C_{22}$-alkyl sulfates,
- the salts, especially the alkali metal salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40,
- of sulfuric monoesters of ethoxylated alkylphenols, especially of sulfuric monoesters of ethoxylated $C_4$-$C_{13}$-alkylphenols (EO level preferably 3 to 40),
- of alkylbenzenesulfonic acids, especially of $C_4$-$C_{22}$-alkylbenzenesulfonic acids, and
- of mono- or disulfonated, alkyl-substituted diphenyl ethers, for example of bis(phenylsulfonic acid) ethers bearing a $C_4$-$C_{24}$-alkyl group on one or both aromatic rings.

Examples of anionic emulsifies, which bear a phosphate or phosphonate group, include, but are not limited to the following salts are selected from the following groups:

- the salts, especially the alkali metal and ammonium salts, of mono- and dialkyl phosphates, especially $C_8$-$C_{22}$-alkyl phosphates,
- the salts, especially the alkali metal and ammonium salts, of phosphoric monoesters of $C_2$-$C_3$-alkoxylated alkanols, preferably having an alkoxylation level in the range from 2 to 40, especially in the range from 3 to 30, for example phosphoric monoesters of ethoxylated $C_8$-$C_{22}$-alkanols, preferably having an ethoxylation level (EO level) in the range from 2 to 40, phosphoric monoesters of propoxylated $C_8$-$C_{22}$-alkanols, preferably having a propoxylation level (PO level) in the range from 2 to 40, and phosphoric monoesters of ethoxylated-co-propoxylated $C_8$-$C_{22}$-alkanols, preferably having an ethoxylation level (EO level) in the range from 1 to 20 and a propoxylation level of 1 to 20, the salts, especially the alkali metal and ammonium salts, of phosphoric monoesters of ethoxylated alkylphenols, especially phosphoric monoesters of ethoxylated $C_4$-$C_{13}$-alkylphenols (EO level preferably 3 to 40), the salts, especially the alkali metal and ammonium salts, of alkylphosphonic acids, especially $C_8$-$C_{22}$-alkylphosphonic acids and the salts, especially the alkali metal and ammonium salts, of alkylbenzenephosphonic acids, especially $C_4$-$C_{22}$-alkylbenzenephosphonic acids.

Further suitable anionic surfactants can be found in Houben-Weyl, Methoden der organischen Chemie [Methods of Organic Chemistry], volume XIV/1, Makromolekulare Stoffe [Macromolecular Substances], Georg-Thieme-Verlag, Stuttgart, 1961, p. 192-208.

Preferably, the surfactant comprises at least one anionic emulsifier, which bears at least one sulfate or sulfonate group. The at least one anionic emulsifier, which bears at least one sulfate or sulfonate group, may be the sole type of anionic emulsifiers. However, mixtures of at least one anionic emulsifier, which bears at least one sulfate or sulfonate group, and at least one anionic emulsifier, which bears at least one phosphate or phosphonate group, may also be used. In such mixtures, the amount of the at least one anionic emulsifier, which bears at least one sulfate or sulfonate group, is preferably at least 50% by weight, based on the total weight of anionic surfactants used in the process of the present invention. In particular, the amount of anionic emulsifiers, which bear at least one phosphate or phosphonate group does not exceed 20% by weight, based on the total weight of anionic surfactants used in the process of the present invention.

As well as the aforementioned anionic surfactants, the surfactant may also comprise one or more nonionic surface-active substances, which are especially selected from nonionic emulsifiers. Suitable nonionic emulsifiers are e.g. araliphatic or aliphatic nonionic emulsifiers, for example ethoxylated mono-, di- and trialkylphenols (EO level: 3 to 50, alkyl radical: $C_4$-$C_{10}$), ethoxylates of long-chain alcohols (EO level: 3 to 100, alkyl radical: $C_8$-$C_{36}$), and polyethylene oxide/polypropylene oxide homo- and copolymers. These may comprise the alkylene oxide units copolymerized in random distribution or in the form of blocks. Very suitable examples are the EO/PO block copolymers. Preference is given to ethoxylates of long-chain alkanols (alkyl radical $C_1$-$C_{30}$, mean ethoxylation level 5 to 100) and, among these, particular preference to those having a linear $C_{12}$-$C_{20}$ alkyl radical and a mean ethoxylation level of 10 to 50, and also to ethoxylated monoalkylphenols.

In a particular embodiment of the invention, the surfactants used in the process of the present invention comprise less than 20% by weight, especially not more than 10% by weight, of nonionic surfactants, based on the total amount of surfactants used in the process of the present invention, and especially do not comprise any nonionic surfactant. In another embodiment of the invention, the surfactants used in the process of the present invention comprise at least one anionic surfactant and at least one non-ionic surfactant, the ratio of anionic surfactants to non-ionic surfactants being usually in the range form 0.5:1 to 10:1, in particular from 1:1 to 5:1.

For the purposes of the invention it has been found beneficial, if the total amount of surfactants present in the emulsion polymerisation of the monomers M is in the range from 0.5% to 8% by weight, in particular in the range from 1% to 6% by weight, especially in the range from 2% to 5% by weight, based on the amount of the monomers M(i), M(ii) and M(iii), respectively, polymerized in the respective step (i), step (ii) and step (iii).

The aqueous reaction medium of the emulsion polymerization may, in principle, also comprise minor amounts (5% by weight) of water-soluble organic solvents, for example methanol, ethanol, isopropanol, butanols, pentanols, but also acetone, etc. Preferably, however, the process of the invention is conducted in the complete or almost complete absence of such solvents.

The conditions required for the performance of the radical emulsion polymerisation of steps (i), (ii) and (iii) are sufficiently familiar to those skilled in the art, for example from the prior art cited at the outset and from “Emulsionspolymerisation” [Emulsion Polymerisation] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE 4003422 A and Dispersionen synthetischer Hochpolymerer [Dispersions of Synthetic High Polymers], F. Hölscher, Springer-Verlag, Berlin (1969)], EP 184091, EP 710680, WO 2012/130712 and WO 2016/04116.

It is frequently advantageous when the aqueous polymer dispersion obtained on completion of polymerisation is subjected to a post-treatment to reduce the residual monomer content. This post-treatment is effected either chemically, for example by completing the polymerisation reaction using a more effective free-radical initiator system (known as post-polymerisation), and/or physically, for example by stripping the aqueous polymer dispersion with steam or inert gas. Corresponding chemical and physical methods are familiar to those skilled in the art, for example from EP 771328 A, DE 19624299 A, DE 19621027 A, DE 19741184 A, DE 19741187 A, DE 19805122 A, DE 19828183 A, DE 19839199 A, DE 19840586 A and DE 19847115 A. The combination of chemical and physical post-treatment has the advantage that it removes not only the unconverted ethylenically unsaturated monomers, but also other disruptive volatile organic constituents (VOCs) from the aqueous polymer dispersion.

The final pH of the polymer dispersion of the present invention and in particular the polymer dispersion obtainable by the process of the present invention may adjusted by addition of a base such that the pH of the polymer dispersion is at least pH 7.5, in particular at least pH 7.8, especially at least pH 8.0 e.g. in the range of 7.5 to 13, in particular in the range of 7.8 to 12 and especially in the range of 8.0 to 11.5. In a particular embodiment, the polymer dispersion of the present invention has a pH in the range of pH 7.5 to 9.5, especially in the range of pH 8.0 to 9.0. In another particular embodiment, the polymer dispersion of the present invention has a pH in the range of pH 10.0 to 11.5, especially in the range of pH 10.5 to 11.5.

In a paint, pigments that are typically used, especially $TiO_2$, may be replaced in whole or in part by the polymer dispersions described here and obtainable by the process of the invention. The components of such paints typically include water, thickener, base, pigment dispersant, associative thickener, defoamer, biocide, binder, and film-forming assistant.

The polymer dispersions obtainable by the process of the invention can be used for similar applications in other coatings consisting of resinous condensation products, such as phenolates and aminoplasts, examples being urea-formaldehyde and melamine-formaldehyde. It is similarly possible for them to be used in other coatings, based on water-dispersible alkyds, polyurethanes, polyesters, ethylene-vinyl acetates and also styrene-butadiene.

Using the polymer dispersions obtainable by the process of the invention in paper coatings leads to an increase in the paper gloss. This can be attributed to the shell, which is deformable under pressure, in contrast to inorganic pigments. Paper print quality is also boosted. Replacing inorganic pigments by the polymer dispersions described here, obtainable by the process of the invention, leads to a reduction in the density of the coating and hence to paper which is lighter in weight.

In cosmetics, the polymer dispersions obtainable by the process of the invention can be used, for example, in sun protection creams for boosting the photoprotective effect. The unusual light-scattering properties increase the likelihood of absorption of UV radiation by UV-active substances in the sun cream.

The polymer dispersions obtainable by the process of the invention can additionally be used in foams, crop protection compositions, thermoplastic molding compounds, and liquid inks.

A subject of the invention is an aqueous polymer dispersion obtainable by the process of the invention as described above.

Another subject of the invention is the use of the aqueous polymer dispersion of the invention in paints, paper coatings, foams, crop protection compositions, cosmetic compositions, liquid inks, or thermoplastic molding compounds.

Another subject of the invention is the use of the aqueous polymer dispersion of the invention to increase the whiteness in paints.

Another subject of the invention are paints comprising an aqueous polymer dispersion obtainable by the process of the invention.

Another subject of the invention is a paint in the form of an aqueous composition comprising a) aqueous polymer dispersion and/or emulsion polymer particles as defined above,
b) at least one film-forming polymer,
c) optionally organic fillers or inorganic fillers and/or
d) optionally further organic pigments or inorganic pigments,
e) optionally at least one customary auxiliary, and
f) water.

Suitable film-forming polymers may be aqueous emulsion polymers based on purely acrylate polymers and/or styrene-acrylate polymers, and also any further film-forming polymers for coatings consisting of resinous condensation products comprising phenolates and aminoplasts and also comprising urea-formaldehyde and melamine-formaldehyde. It is similarly possible to use further polymers based on water-dispersible alkyds, polyurethanes, polyesters, ethylene-vinyl acetates and also styrene-butadiene.

Suitable fillers in clearcoat systems include, for example, matting agents to thus substantially reduce gloss in a desired manner. Matting agents are generally transparent and may be not only organic but also inorganic. Inorganic fillers based on silica are most suitable and are widely available commercially. Examples are the Syloid® brands of W.R. Grace & Company and the Acematt® brands of Evonik Industries AG. Organic matting agents are for example available from BYK-Chemie GmbH under the Ceraflour® and the Ceramat® brands, from Deuteron GmbH under the Deuteron MK® brand. Suitable fillers for emulsion paints further include aluminosilicates, such as feldspars, silicates, such as kaolin, talc, mica, magnesite, alkaline earth metal carbonates, such as calcium carbonate, for example in the form of calcite or chalk, magnesium carbonate, dolomite, alkaline earth metal sulfates, such as calcium sulfate, silicon dioxide, etc. The preference in paints is naturally for finely divided fillers. The fillers can be used as individual components. In practice, however, filler mixtures have been found to be particularly advantageous, examples being calcium carbonate/kaolin and calcium carbonate/talc. Gloss paints generally include only minimal amounts of very finely divided fillers or contain no fillers at all.

Finely divided fillers can also be used to enhance the hiding power and/or to economize on white pigments. Blends of fillers and color pigments are preferably used to control the hiding power of the hue and of the depth of shade.

Suitable pigments include, for example, inorganic white pigments such as titanium dioxide, preferably in the rutile form, barium sulfate, zinc oxide, zinc sulfide, basic lead carbonate, antimony trioxide, lithopone (zinc sulfide+barium sulfate) or colored pigments, for example iron oxides, carbon black, graphite, zinc yellow, zinc green, ultramarine, manganese black, antimony black, manganese violet, Prussian blue or Parisian green. In addition to inorganic pigments, the emulsion paints of the present invention may also comprise organic color pigments, for example sepia, gamboge, Cassel brown, toluidine red, para red, Hansa yellow, indigo, azo dyes, anthraquinonoid and indigoid dyes and also dioxazine, quinacridone, phthalocyanine, isoindolinone and metal-complex pigments. Also useful are the Luconyl® brands from BASF SE, e.g., Luconyl® yellow, Luconyl® brown and Luconyl® red, especially the transparent versions.

Customary auxiliaries include wetting or dispersing agents, such as sodium polyphosphates, potassium polyphosphates, ammonium polyphosphates, alkali metal and ammonium salts of acrylic acid copolymers or of maleic anhydride copolymers, polyphosphonates, such as sodium 1-hydroxyethane-1,1-diphosphonate, and also naphthalenesulfonic acid salts, in particular their sodium salts.

More importance attaches to the film-forming assistants, the thickeners and defoamers. Suitable film-forming assistants include, for example, Texanol® from Eastman Chemicals and the glycol ethers and esters as are commercially available for example from BASF SE, under the names Solvenon® and Lusolvan®, and from Dow Chemicals under the tradename Dowanol®. The amount is preferably <10 wt % and more preferably <5 wt %, based on overall formulation. It is also possible to formulate entirely without solvents.

Suitable auxiliaries further include flow control agents, defoamers, biocides and thickeners. Useful thickeners include, for example, associative thickeners, such as polyurethane thickeners. The amount of thickener is preferably less than 2.5 wt %, more preferably less than 1.5 wt % of thickener, based on paint solids content. Further directions regarding the formulation of wood paints are described at length in "water-based acrylates for decorative coatings" by the authors M. Schwartz and R. Baumstark, ISBN 3-87870-726-6.

The paints of the invention are produced in a known manner by blending the components in customary mixers. A tried and tested procedure is to first prepare an aqueous paste or dispersion from the pigments, water and optionally the auxiliaries and only then to mix the polymeric binder, i.e., generally the aqueous dispersion of the polymer, with the pigment paste or, respectively, pigment dispersion.

The paint of the invention can be applied to substrates in a conventional manner, e.g., by brushing, spraying, dipping, rolling or knifecoating.

The paints of the present invention are notable for ease of handling and good processing characteristics, and also for a high level of whiteness. The paints have a low noxiant content. They have good performance characteristics, for example good fastness to water, good adherence in the wet state, and good block resistance, good recoatability, and they exhibit good flow on application. The equipment used is easily cleaned with water.

The invention is illustrated by the following nonlimiting examples.

EXPERIMENTAL METHODS

Abbreviations

- AMA allyl methacrylate
- AN acrylonitrile
- DMI dimethyl itaconate
- GLYFOMA methacrylate of the formaldehyde acetal of glycerol (mixture of 1,3-dioxolan-4-ylmethyl methacrylate and 1,3-dioxan-5-yl methacrylate
- IBOMA isobornyl methacrylate
- IBOA isobornyl acrylate
- MAA methacrylic acid
- Sty styrene

Measuring the Particle Size

The particle sizes here and in the appended claims were determined by means of hydrodynamic fractionation using a PSDA (Particle Size Distribution Analyzer) from Polymer Labs. The Cartridge PL0850-1020 column type used was operated with a flow rate of 2 ml·min$^{-1}$. The samples were diluted with the eluent solution to an absorption of 0.03 AU·µl$^{-1}$.

The sample is eluted by the size exclusion principle in dependence on the hydrodynamic diameter. The eluent contains 0.2 wt % dodecyl poly(ethylene glycol ether)$_{23}$, 0.05 wt % sodium dodecyl sulfate, 0.02 wt % sodium dihydrogenphosphate, and 0.02 wt % sodium azide in deionized water. The pH is 5.8. The elution time is calibrated using PS calibration lattices. Measurement takes place in the range from 20 nm to 1200 nm. Detection is carried out using a UV detector at a wavelength of 254 nm.

The particle size may also be determined using a Coulter M4+(particle analyzer) or by means of photon correlation spectroscopy, also known as quasielastic light scattering or dynamic light scattering (ISO 13321 standard), using a HPPS (high performance particle sizer) from Malvern.

Carrying Out the Whiteness Measurement (=L Value)

6 g of the color paste described below and 1.04 g of the approximately 30% dispersion of voided particles are weighed out into a vessel and the mixture is homogenized without stirred incorporation of air. Using a 200 µm coater, with a speed of 0.9 cm/sec, a film of this mixture is drawn down onto a black plastic film (matt finish, article No. 13.41 EG 870934001, Bernd Schwegmann GmbH & Co. KG, DE). The samples are dried at 23° C. and a relative humidity of 40 to 50% for 24 hours. Thereafter, using a Minolta CM-508i spectrophotometer, the whiteness is measured at three different locations. The measurement points are marked, for subsequent determination of the corresponding layer thicknesses of the color film with a micrometer screw, by differential measurement relative to the uncoated plastic film. After an average layer thickness has been calculated and after an average whiteness has been calculated from the three individual measurements, the final step is a standardization of the resulting whiteness to a dry film thickness of 50 µm by linear extrapolation. The calibration required for this purpose took place by measuring the whiteness of a standard dispersion of hollow particles in a dry film thickness range from about 30 to 60 µm.

Preparing the Color Paste

A vessel is charged with 185 g of water, after which the following ingredients are added in the order stated with a dissolver running at about 1000 rpm, with stirring to homogeneity for a total of about 15 minutes:

2 g of 20% strength sodium hydroxide solution, 12 g of Dispex® CX-4320 (copolymer of maleic acid and diisobutylene from BASF SE), 6 g of Agitan® E 255 (siloxane defoamer from Münzing Chemie GmbH), 725 g of Acronal® A 684 (binder, 50% dispersion from BASF SE), 40 g of Texanol® (film-forming assistant from Eastman Chemical Company), 4 g of Agitan® E 255 (siloxane defoamer from Münzing Chemie GmbH), 25 g of DSX 3000 (30% form, associative thickener: hydrophobic modified polyether (HMPE) from BASF SE), and 2 g of DSX 3801 (45% form, associative thickener: hydrophobic modified ethoxylated urethane (HEUR) from BASF SE).

Solids Content

Solids content was determined by spreading 0.5 to 1.5 g wet polymer latex in a sample vessel with a diameter of 4 cm and drying of the latex using a moisture analyzer (device HR 83 form Mettler-Toledo GmbH, Germany) at a temperature of 140° C. until a constant mass was reached. The ratio of the mass after drying to the mass before drying gave the solids content of the polymer latex.

% Amount of Biocarbon

The amount of biocarbon was determined by radiocarbon analysis of the relative amount of isotope $^{14}C$ vs. a reference material according to the standard ASTM D 6866-18. Sample preparation and analysis was carried out in accordance with method B of the standard ASTM D 6866-18. For this, samples were first combusted to $CO_2$ followed by catalytic reduction of the $CO_2$ in to graphite. The content of isotope $^{14}C$ in thus obtained graphite was measured in a MICADAS AMS system. The $^{14}C/^{12}C$ and $^{14}C/^{12}C$ isotope ratios of the samples, calibration standards (NIST SRM 4990C, Oxalic Acid-II), blanks and quality control standards were measured simultaneously. The $^{14}C$ values determined this way were standardized to $\delta^{13}C=-25‰$ (Stuiver & Polach, Radiocarbon, 19(03) 1977, pp 355-36). The content of biogenic carbon was calculated by the following formula:

$$\text{Biogenic Content (\%)}=pMC_{det}/pMC_{ref}\times 100$$

Where is the $pMC_{det}$ value determined by analysis and $pMC_{ref}$ is the reference pMC.

EXAMPLES

Starting Material:

Emulsifier: 20% b.w. aqueous solution of an alkylbenzenesulfonate, (Disponil® LDBS 20)

Swelling core dispersion: Aqueous polymer dispersion of a copolymer of 72 pphm methyl methacrylate and 28 pphm of methacrylic acid, which was prepared according to WO 2015/024835. The polymer dispersion had a solids content of 33% b.w., a volume median particle size of 155 nm as determined by HDC and a pH of 4.1.

TABLE 1

| Properties of biomonomers | | |
|---|---|---|
| | Tg (homopolymer) [° C.] | mol % Biocarbon |
| DMI | 94 | 71 |
| GLYFOMA | 80-95 | 38 |
| IBOMA | 110 | 77 |
| IBOA | 94 | 71 |

Comparative Example C1

In a polymerization vessel equipped with an anchor stirrer, reflux condenser and two feed vessels an initial charge of 265.6 g of deionized water and 104.6 g of swell-core dispersion was heated in a nitrogen atmosphere to a temperature of 81° C. To this mixture 43.2 g of emulsion feed 1 and 32.0 g of a 2.5% b.w. aqueous sodium peroxodisulfate solution where metered in parallel into the polymerization vessel over 60 min. On completion, 8.4 g of deionized water were added and 378.2 g of emulsion feed 2 together with 14.3 g of a 7.0 wt. % aqueous sodium peroxodisulfate solution was commenced and fed into the reactor for 90 minutes. During addition of emulsion-feed 2, the internal temperature was raised to 92° C. On completion of addition of the emulsion feed 2, 12.9 g of deionized water and 1.2 g of a 7.0 wt. % aqueous sodium peroxodisulfate solution were added.

The reaction mixture had been stirred for 10 minutes before 24.8 g of alpha-methyl styrene were added. After a further 30 min of stirring, 225.6 g of a 2.5 wt. % aqueous sodium hydroxide solution was metered into the polymerization vessel within 105 minutes. During addition, the temperature was lowered to 80° C. After completion of addition, the temperature was raised to 90° C. and then 20.4 g of deionized water were added.

After a 15-minute period of subsequent stirring, 7.8 g of a 10 wt. % aqueous solution of tert-butyl hydroperoxide were metered into the reaction vessel. 96.7 g of emulsion feed 3 was started and metered into the reaction vessel over 45 minutes. 24 minutes after starting emulsion feed 3, an aqueous solution of a reducing-agent consisting of 24.3 g of deionized water, 6.4 g of ascorbic acid and 2.8 g of sodium hydroxide solution (25 wt. % strength) was metered into the reaction vessel within 60 minutes. Completion of the addition was followed by 15 minutes post-polymerization at elevated temperature. Lastly, the reaction mixture was cooled down to room temperature and diluted with 76.9 g of deionized water. The properties of the obtained polymer emulsion are summarized in table 2.

Emulsion Feed 1 (Homogeneous Emulsion of):

16.7 g of deionized water
1.8 g of emulsifier
0.4 g of methacrylic acid
20.6 g of methyl methacrylate
3.7 g of n-butyl methacrylate Emulsion Feed 2 (Homogeneous Emulsion of):

114.8 g of deionized water
6.6 g of emulsifier
1.7 g of linseed-oil fatty-acid
2.2 g of methacrylic acid
0.6 g of allyl methacrylate
252.4 g of styrene Emulsion Feed 3 (Homogeneous Emulsion of):

28.3 g of deionized water
7.6 g of emulsifier
60.8 g of styrene

Examples 1 to 6

The polymer dispersions of examples 1 to 6 were prepared by the protocol of comparative example C1, except that feeds 2 and 3 had the monomer compositions summarized in table 2. Feed 1 was the same as in comparative example 1. In table 2 the relative weights in % b.w. of the monomers with respect to the total weight of monomers in the respective monomer feed are given. Table 2 also summarizes the properties of the polymer dispersions obtained in examples 1 to 6.

TABLE 2

| Comparative example C1, examples 1 to 6 | | | | | | | | |
|---|---|---|---|---|---|---|---|---|
| | | C1 [1)] | 1 | 2 | 3 | 4 | 5 | 6 |
| Feed 2 | Sty | 98.90 | 74.20 | 74.20 | 74.20 | 49.45 | 49.45 | 49.45 |
| | IBOMA | 0 | 24.70 | 24.70 | 24.70 | 49.45 | 49.45 | 49.45 |
| | MAA | 0.85 | 0.85 | 0.85 | 0.85 | 0.85 | 0.85 | 0.85 |
| | AMA | 0.25 | 0.25 | 0.25 | 0.25 | 0.25 | 0.25 | 0.25 |
| Feed 3 | Sty | 100.00 | 100.00 | 60.00 | 40.00 | 100.00 | 60.00 | 40.00 |
| | IBOMA | 0 | 0 | 40.00 | 60.00 | 0 | 40.00 | 60.00 |
| Solids | [%][2)] | 30.3 | 30.2 | 30.3 | 30.1 | 30.0 | 29.2 | 29.4 |
| pH | | 11.5 | 11.8 | 12.1 | 11.6 | 11.8 | 12.6 | 12.6 |
| PS[4)] | [nm] | 398 | 384 | 378 | 377 | 388 | 365 | 364 |
| % bio [3)] | | 0 | 10 | 14 | 16 | 20 | 25 | 27 |
| L value | | 82.1 | 82.3 | 80.7 | 82.2 | 82.9 | 73.5 | 71.8 |

[1)] not according to the invention
[2)] solids content of the polymer dispersion
[3)] mol-% of biocarbon with respect to the total amount of carbon atoms in the polymer, calculated on the basis of the content of biocarbon in the monomers
[4)] median particle size as determined by HDC Comparative Example C2

In a polymerization vessel equipped with an anchor stirrer, reflux condenser and two feed vessels an initial charge of 245.0 g of deionized water and 104.6 g of swell-core dispersion was heated in a nitrogen atmosphere to a temperature of 81° C. To this mixture 48.4 g of emulsion feed 1 and 32.0 g of a 2.5% b.w. aqueous sodium peroxodisulfate solution were metered in parallel into the polymerization vessel over 60 min. On completion, 4.0 g of deionized water were added, and 375.4 g of emulsion feed 2 together with 14.3 g of a 7.0 wt. % aqueous sodium peroxodisulfate solution was commenced and fed into the reactor for 90 minutes. During addition of emulsion-feed 2, the internal temperature was raised to 92° C. On completion of addition of the emulsion feed 2, 14.3 g of deionized water and 1.2 g of a 7.0 wt. % aqueous sodium peroxodisulfate solution were added.

The reaction mixture had been stirred for 10 minutes before 24.8 g of alpha-methyl styrene were added. After a further 30 min of stirring, 223.4 g of a 2.5 wt. % aqueous sodium hydroxide solution was metered into the polymerization vessel within 105 minutes. During addition, the temperature was lowered to 80° C. After completion of addition, the temperature was raised to 90° C. and then 5.8 g of deionized water were added.

After a 15-minute period of subsequent stirring, 7.8 g of a 10 wt. % aqueous solution of tert-butyl hydroperoxide were metered into the reaction vessel. 96.7 g of emulsion feed 3 was started and metered into the reaction vessel over 45 minutes. 24 minutes after starting emulsion feed 3, an aqueous solution of a reducing-agent consisting of 25.0 g of deionized water, 6.4 g of ascorbic acid and 0.6 g of sodium hydroxide solution (25 wt. % strength) was metered into the reaction vessel within 60 minutes. Completion of the addition was followed by 15 minutes post-polymerization at elevated temperature. Lastly, the reaction mixture was cooled down to room temperature and diluted with 89.3 g of deionized water. The properties of the obtained polymer emulsion are summarized in table 3.

Emulsion Feed 1 (Homogeneous Emulsion of):
- 21.5 g of deionized water
- 2.1 g of emulsifier
- 0.5 g of methacrylic acid
- 0.03 g of allyl methacrylate
- 20.6 g of methyl methacrylate
- 3.7 g of n-butyl methacrylate Emulsion Feed 2 (Homogeneous Emulsion of):
- 112.3 g of deionized water
- 6.3 g of emulsifier
- 1.7 g of linseed-oil fatty-acid
- 2.1 g of methacrylic acid
- 0.6 g of allyl methacrylate
- 232.4 g of styrene
- 20.0 g of acrylonitrile Emulsion Feed 3 (Homogeneous Emulsion of):
- 28.3 g of deionized water
- 7.6 g of Emulsifier
- 60.8 g of styrene Examples 7 to 12

The polymer dispersions of examples 7 to 12 were prepared by the protocol of comparative example C2, except that feeds 2 and 3 had the monomer compositions summarized in table 3. Feed 1 was the same as in comparative example 2. In table 3 the relative weights in % b.w. of the monomers with respect to the total weight of monomers in the respective monomer feed are given. Table 3 also summarizes the properties of the polymer dispersions obtained in examples 7 to 12.

TABLE 3

| Comparative example C2, examples 7 to 12 | | | | | | | | |
|---|---|---|---|---|---|---|---|---|
| | | C2[1)] | 7 | 8 | 9 | 10 | 11 | 12 |
| Feed 2 | Sty | 91.10 | 68.30 | 68.30 | 68.30 | 45.55 | 45.55 | 45.55 |
| | IBOMA | 0 | 22.80 | 22.80 | 22.80 | 45.55 | 45.55 | 45.55 |
| | AN | 7.85 | 7.85 | 7.85 | 7.85 | 7.85 | 7.85 | 7.85 |
| | MAA | 0.80 | 0.80 | 0.80 | 0.80 | 0.80 | 0.80 | 0.80 |
| | AMA | 0.25 | 0.25 | 0.25 | 0.25 | 0.25 | 0.25 | 0.25 |
| Feed 3 | Sty | 100.00 | 100.00 | 60.00 | 40.00 | 100.00 | 60.00 | 40.00 |
| | IBOMA | 0 | 0 | 40.00 | 60.00 | 0 | 40.00 | 60.00 |
| Solids | [%][2)] | 31.0 | 30.9 | 31.0 | 30.0 | 30.5 | 29.8 | 29.8 |
| pH | | 8.4 | 8.9 | 8.2 | 8.2 | 8.5 | 8.4 | 8.6 |
| PS[4)]) | [nm] | 409 | 404 | 441 | 474 | 412 | 394 | 394 |
| % bio [3)] | | 0 | 9 | 13 | 15 | 19 | 23 | 26 |
| L value | | 82.8 | 83.1 | 83.0 | 81.5 | 83.6 | 80.9 | 80.6 |

[1)]not according to the invention

[2)]solids content of the polymer dispersion

[3)] mol-% of biocarbon with respect to the total amount of carbon atoms in the polymer, calculated on the basis of the content of biocarbon in the monomers Comparative Example C3

In a polymerization vessel equipped with an anchor stirrer, reflux condenser and two feed vessels an initial charge of 318.8 g of deionized water and 146.5 g of swell-core dispersion was heated in a nitrogen atmosphere to a temperature of 81° C. To this mixture 68.0 g of emulsion feed 1 and 44.8 g of a 2.5% b.w. aqueous sodium peroxodisulfate solution were metered in parallel into the polymerization vessel over 60 min. On completion, 5.6 g of deionized water were added and 637.8 g of emulsion feed 2 together with 20.0 g of a 7.0 wt. % aqueous sodium peroxodisulfate solution was commenced and fed into the reactor for 90 minutes. During addition of emulsion-feed 2, the internal temperature was raised to 92° C. On completion of addition of the emulsion feed 2, 20.0 g of deionized water and 1.2 g of a 7.0 wt. % aqueous sodium peroxodisulfate solution were added.

The reaction mixture had been stirred for 10 minutes before 2.8 g of 4-hydroxy TEMPO were added. Thereafter, 74.3 g of emulsion feed 3 was started and metered into the polymerization vessel within 21 minutes. After a further 10 min of stirring, 324.8 g of a 2.5 wt. % aqueous sodium hydroxide solution was metered into the polymerization vessel within 45 minutes followed by the addition of 8.1 g of deionized water and stirring of the reaction mixture for another 15 minutes.

Subsequently, 11.2 g of a 10 wt. % aqueous solution of tert-butyl hydroperoxide were metered into the polymerization vessel. After addition of 15.0 g of deionized water, an aqueous reducing-agent solution consisting of 35.0 g of deionized water, 9.0 g of ascorbic acid and 0.9 g of sodium hydroxide solution (25 wt. % strength) was metered into the polymerization vessel within 60 minutes. Lastly, the reaction mixture was cooled down to room temperature and diluted with 119.4 g of deionized water. The properties of the obtained polymer emulsion are summarized in table 4.

Emulsion Feed 1 (Homogeneous Emulsion of):

30.1 g of deionized water
3.1 g of emulsifier
0.7 g of methacrylic acid
0.06 g of allyl methacrylate
28.8 g of methyl methacrylate
5.2 g of n-butyl methacrylate Emulsion Feed 2 (Homogeneous Emulsion of):

194.2 g of deionized water
9.0 g of emulsifier
2.4 g of linseed-oil fatty-acid
3.6 g of methacrylic acid
1.0 g of allyl methacrylate
427.6 g of styrene Emulsion Feed 3 (Homogeneous Emulsion of):

18.9 g of deionized water
10.6 g of emulsifier
44.8 g of styrene

Examples 13 to 19

The polymer dispersions of examples 13 to 19 were prepared by the protocol of comparative example C3, except that feeds 2 and 3 had the monomer compositions summarized in table 3. Feed 1 was the same as in comparative example C3. In table 4 the relative weights in % b.w. of the monomers with respect to the total weight of monomers in the respective monomer feed are given. Table 4 also summarizes the properties of the polymer dispersions obtained in examples 13 to 19.

TABLE 4

| | | Comparative example C3, examples 13 to 19 | | | | | | | |
|---|---|---|---|---|---|---|---|---|---|
| | | C3[1)] | 13 | 14 | 15 | 16 | 17 | 18 | 19 |
| Feed 2 | Sty | 91.10 | 60.00 | 63.90 | 67.80 | 45.80 | 60.00 | 60.00 | 53.55 |
| | IBOMA | 0 | 38.90 | 35.00 | 31.10 | 53.10 | 0 | 0 | 0 |
| | IBOA | 0 | 0 | 0 | 0 | 0 | 38.90 | 0 | 0 |
| | DMI | 0 | 0 | 0 | 0 | 0 | 0 | 38.90 | 0 |
| | GLYFOMA | 0 | 0 | 0 | 0 | 0 | 0 | 0 | 45.35 |
| | MAA | 0.85 | 0.85 | 0.85 | 0.85 | 0.85 | 0.85 | 0.85 | 0.85 |
| | AMA | 0.25 | 0.25 | 0.25 | 0.25 | 0.25 | 0.25 | 0.25 | 0.25 |
| Feed 3 | Sty | 100.00 | 100.00 | 62.00 | 50.00 | 100.00 | 60.00 | 100.00 | 60.00 |
| | IBOMA | 0 | 0 | 38.00 | 50.00 | 0 | 40.00 | 0 | 40.00 |
| Solids | [%][2)] | 30.8 | 30.9 | 30.7 | 30.5 | 30.8 | 30.9 | 31.0 | 31.3 |
| pH | | 9.0 | 9.2 | 9.3 | 10.3 | 9.1 | 9.0 | 7.9 | 8.9 |
| PS[4)] | [nm] | 387 | 398 | 398 | 378 | 399 | 378 | 411 | 388 |
| % bio [3)] | | 0 | 19 | 19 | 19 | 30 | 20 | 15 | 10 |
| % bio [5)] | | 1 | 20 | — | — | 31 | 22 | 16 | 11 |
| L value | | 81.1 | 82.4 | 81.9 | 80.3 | 81.2 | 80.6 | 79.6 | 81.7 |

[1)] not according to the invention
[2)] solids content of the polymer dispersion
[3)] mol-% of biocarbon with respect to the total amount of carbon atoms in the polymer, calculated on the basis of the content of biocarbon in the monomers
[4)] median particle size as determined by HDC
[5)] mol-% of biocarbon with respect to the total amount of carbon atoms in the polymer, determined according to ASTM D 6866-18 (Method B).

The invention claimed is:

1. An aqueous polymer dispersion of voided polymer particles, where the polymer particles comprise:

i) an alkali swellable polymer core of polymerized ethylenically unsaturated monomers M(i) comprising polymerized acid monomers M(i.ac) in an amount sufficient for allowing the polymer core to swell at a pH of at least pH 7.5;

ii) an intermediate polymer layer of polymerized ethylenically unsaturated monomers M(ii);

iii) a polymer shell of polymerized ethylenically unsaturated monomers M(iii) having a theoretical glass transition temperature according to Fox of at least 50° C.;

where the monomers M(iii) comprise at least 10% by weight, based on the total weight of the monomers M(iii), of one or more monomers M(iii.a) whose homopolymers have a glass transition temperature of at least 50° C., where the monomer M(iii.a) is selected from the group consisting of $C_5$-$C_{20}$-cycloalkyl esters of acrylic acid, $C_5$-$C_{20}$-cycloalkyl esters of methacrylic acid, $C_5$-$C_{20}$-cycloalkylmethyl esters of acrylic acid, $C_5$-$C_{20}$-cycloalkylmethyl esters of methacrylic acid, where cycloalkyl in the aforementioned monomers is mono-, bi- or tricyclic and may be unsubstituted or carry 1, 2, 3 or 4 methyl groups;

$C_3$-$C_{20}$-heterocycloalkyl esters of acrylic acid, $C_3$-$C_{20}$-heterocycloalkyl esters of methacrylic acid, $C_3$-$C_{20}$-heterocycloalkylmethyl esters of acrylic acid, $C_3$-$C_{20}$-heterocycloalkylmethyl esters of methacrylic acid, where heterocycloalkyl in the aforementioned monomers has a total of 5 to 16 ring-forming atoms, where 1, 2 or 3 non-adjacent ring-forming atoms are oxygen atoms while the remainder of the ring-forming atoms are carbon atoms, and where heterocycloalkyl is mono-, bi- or tricyclic and may be unsubstituted or carry 1, 2, 3 or 4 methyl groups;

di-$C_1$-$C_2$-alkyl esters of itaconic acid; and combinations thereof.

2. The aqueous polymer dispersion of claim 1, where the monomers M(iii.a) are selected from the group consisting of cyclohexyl methacrylate, 2-norbornyl acrylate, norbornyl methacrylate, isobornyl acrylate, isobornyl methacrylate, cyclohexylmethyl acrylate, cyclohexylmethyl methacrylate, 1,3-dioxan-5-yl-acrylate, 1,3-dioxan-5-yl-methacrylate, 2,2-dimethyl-1,3-dioxan-5-yl-acrylate, 2,2-dimethyl-1,3-dioxan-5-yl-methacrylate, 1,3-dioxolan-4-yl-methyl acrylate, 1,3-dioxolan-4-ylmethyl methacrylate, 2,2-dimethyl-1,3-dioxolan-4-ylmethyl acrylate, 2,2-dimethyl-1,3-dioxolan-4-ylmethyl methacrylate, oxolan-2-yl-methyl acrylate (tetrahydrofurfuryl acrylate), oxolan-2-yl-methyl methacrylate (tetrahydrofurfuryl methacrylate) and dimethyl itaconate and combinations thereof.

3. The aqueous polymer dispersion of claim 2, where the monomers M(iii.a) are selected from the group consisting of dimethyl itaconate, 2-norbornyl acrylate, 2-norbornyl methacrylate, 2-isobornyl acrylate, 2-isobornyl methacrylate, 1,3-dioxan-5-yl-methacrylate, 1,3-dioxolan-4-ylmethyl methacrylate and combinations thereof.

4. The aqueous polymer dispersion of claim 1, where at least the 35% of the carbon atoms of the monomers M(iii.a) are of biological origin.

5. The aqueous polymer dispersion of claim 1, where the monomers M(iii) additionally comprise a monomer M(iii.b), which is a monovinylaromatic monomer.

6. The aqueous polymer dispersion of claim 1, where the monomers M(iii) additionally comprise a monomer M(iii.c), which is an alkenyl nitrile.

7. The aqueous polymer dispersion of claim 5, where the monomers M(iii) comprise a) 10 to 90% by weight, based on the total weight of the monomers M(iii), of at least one monomer M(iii.a); and b) 10 to 90% by weight, based on the total weight of the monomers M(iii), of at least one monomer M(iii.b);

c) 0 to 20% by weight, based on the total weight of the monomers M(iii), of one or more monomers M(iii.c);

where the total amount of monomers M(iii.a), M(iii.b) and M(iii.c) is at least 95% weight, based on the total amount of monomers M(iii).

8. The aqueous polymer dispersion of claim 1, where the polymer shell comprises a first polymer shell of polymerized monomers M(iii.1) arranged on the intermediate layer and at least one further polymer shell of polymerized monomers M(iii.2) arranged on the first polymer shell.

9. The aqueous polymer dispersion of claim 8, where the monomers M(iii.1) comprise from 0.01 to 2% by weight, based on the total weight of the monomers M(iii.1) of a crosslinking monomer M(iii.1.cr).

10. The aqueous polymer dispersion of claim 8, where the weight ratio of the first polymer shell to the second polymer shell is in the range of 2:1 to 20:1.

11. The aqueous polymer dispersion of claim 1, where the acid monomers M(i.ac) are selected from the group consisting of monoethylenically unsaturated monocarboxylic acids having 3 to 6 carbon atoms and monoethylenically unsaturated dicarboxylic acids having 4 to 8 carbon atoms.

12. The aqueous polymer dispersion of claim 1, where the amount of acid monomers M(i.ac) in the monomers M(i) is at least 5% by weight, based on the total weight of monomers M(i).

13. The aqueous polymer dispersion of claim 1, where the monomers M(i) further comprise one or more non-ionic monomers M(i.ni) having a solubility in deionized water at 20° C. and 1 bar of at most 50 g/L.

14. The aqueous polymer dispersion of claim 13, where the monomers M(i.ni) are selected from the group consisting of esters of vinyl alcohol or allyl alcohol with $C_1$-$C_{20}$ monocarboxylic acids, $C_1$-$C_{20}$-alkyl esters of monoethylenically unsaturated $C_3$-$C_8$ monocarboxylic acids, monomers M(iii.a), monovinylaromatic monomers M(iii.b) and alkenyl nitriles M(iii.c) and combinations thereof.

15. The aqueous polymer dispersion of claim 13, where the amount of acid monomers M(i.ni) in the monomers M(i) is from 50 to 95% by weight, based on the total weight of monomers M(i).

16. The aqueous polymer dispersion of claim 1, where the monomers M(ii) comprise at least 90% by weight of one or more non-ionic monoethylenically unsaturated monomers M(ii.a) having a solubility in deionized water at 20° C. and 1 bar of at most 50 g/L.

17. The aqueous polymer dispersion of claim 16, where the monomers M(ii.a) are selected from the group consisting of $C_1$-$C_{20}$-alkyl esters of acrylic acid, $C_1$-$C_{20}$-cycloalkyl esters of methacrylic acid, $C_5$-$C_{20}$-cycloalkyl esters of acrylic acid, $C_5$-$C_{20}$-cycloalkyl esters of methacrylic acid and combinations thereof.

18. The aqueous polymer dispersion of claim 1, where the monomers M(ii) comprise from 0.01 to 2% by weight, based on the total weight of the monomers M(ii), of a crosslinking monomer.

19. The aqueous polymer dispersion of claim 1, where the amount of the polymer shell is in the range of 60 to 95% by weight, based on the total weight of the polymer particles.

20. A process for producing an aqueous polymer dispersion of voided polymer particles as claimed in claim 1, which comprises (i) providing an aqueous polymer dispersion of the polymer particles of polymerized ethylenically unsaturated monomers M(i), where the aqueous polymer dispersion has a pH value of less than pH 7;

(ii) subjecting the monomers M(ii) to a radical aqueous emulsion polymerization in the aqueous polymer dispersion provided in step (i) at a pH value of less than pH 7, whereby an aqueous polymer dispersion of polymer particles having an alkali swellable polymer core of polymerized ethylenically unsaturated monomers M(i) and an intermediate layer of polymerized monomers M(ii) is obtained;

(iii) subjecting the monomers M(iii) to a radical aqueous emulsion polymerization in the aqueous polymer dispersion obtained in step (ii)

(iv) a neutralization step, where the polymer dispersion is neutralized to a pH of at least pH 7.5;

where step (iv) is carried out before, during or after step (iii).

21. The process of claim 20, where steps (iii) and (iv) are carried out in the following order:

(iii.1) a first radical emulsion polymerization of monomers M(iii.1) at a pH of less than pH 7;

(iv) a neutralization of the polymer dispersion obtained in step (iii.1) to a pH of at least pH 7.5; and (iii.2) a second radical emulsion polymerization of monomers M(iii.2) in the presence of the polymer dispersion obtained in step (iv) at a pH of at least pH 7.5.

22. The process of claim 21, where the neutralization is carried out in the presence of a radical scavenger or a monoethylenically unsaturated monomer, which is not capable of undergoing a radical homopolymerization.

23. The process of claim 22, where the radical scavenger or the monoethylenically unsaturated monomer, which is not capable of undergoing a radical homopolymerization, is added to the polymer dispersion obtained in step (iii.1) before the neutralization is carried out.

24. The process of claim 22, wherein the monoethylenically unsaturated monomer, which is not capable of undergoing a radical homopolymerization, is selected from 2-propenylaromatic hydrocarbons, di- and trisubstituted olefins having 4 to 8 carbon atoms, 1,1-diphenylethene, $C_1$-$C_{10}$-alkyl esters of 2-(branched $C_3$-$C_6$ alkyl) acrylic acid, such as $C_1$-$C_{10}$-alkyl esters of 2-(tert-butyl) acrylic acid, $C_1$-$C_{10}$-alkyl esters of 2-phenylacrylic acid and mixtures thereof.

25. The process of claim 20, wherein the volume median of the particle size, determined by hydrodynamic fractionation, of polymer particles in the polymer dispersion provided in step (i) in the unswollen state is in the range from 50 to 300 nm.

26. An aqueous polymer dispersion obtainable by a process of claim 20.

27. A polymer composition of voided polymer particles, which are obtained by drying an aqueous polymer dispersion of claim 1.

* * * * *